United States Patent
Schoenen et al.

(10) Patent No.: US 10,791,259 B2
(45) Date of Patent: Sep. 29, 2020

(54) DEVICES AND METHODS FOR REPURPOSING IR TRANSMITTERS

(71) Applicant: GOOGLE LLC, Mountain View, CA (US)

(72) Inventors: Alexander Schoenen, Portland, OR (US); Brian Conner, San Jose, CA (US); Orville Buenaventura, San Bruno, CA (US)

(73) Assignee: GOOGLE LLC, Mountain View, CA (US)

( * ) Notice: Subject to any disclaimer, the term of this patent is extended or adjusted under 35 U.S.C. 154(b) by 717 days.

(21) Appl. No.: 14/818,170

(22) Filed: Aug. 4, 2015

(65) Prior Publication Data

US 2017/0041524 A1 Feb. 9, 2017

(51) Int. Cl.
| | |
|---|---|
| *H04N 5/232* | (2006.01) |
| *H04N 5/225* | (2006.01) |
| *H04B 10/114* | (2013.01) |
| *G08C 17/02* | (2006.01) |
| *G08C 23/04* | (2006.01) |

(52) U.S. Cl.
CPC ......... *H04N 5/23206* (2013.01); *G08C 17/02* (2013.01); *G08C 23/04* (2013.01); *H04B 10/1149* (2013.01); *H04N 5/2256* (2013.01); *H04N 5/23245* (2013.01); *G08C 2201/40* (2013.01)

(58) Field of Classification Search
None
See application file for complete search history.

(56) References Cited

U.S. PATENT DOCUMENTS

| | | | | |
|---|---|---|---|---|
| 4,809,359 | A * | 2/1989 | Dockery | G08C 23/04 398/106 |
| 5,982,423 | A * | 11/1999 | Sekiguchi | H04N 5/2254 250/330 |
| 2003/0175010 | A1 * | 9/2003 | Nomura | H04N 1/0044 386/248 |
| 2004/0189485 | A1 | 9/2004 | Wang | |
| 2006/0020999 | A1 * | 1/2006 | Schlarb | G08C 23/04 725/153 |

(Continued)

OTHER PUBLICATIONS

Google Inc., PCT/US2016/045596, International Search Report and Written Opinion, dated Nov. 9, 2016, 10 pgs.

*Primary Examiner* — Mark T Monk
(74) *Attorney, Agent, or Firm* — Morgan, Lewis & Bockius LLP

(57) ABSTRACT

The various embodiments described herein include methods, devices, and systems for repurposing IR transmitters. In one aspect, a method is performed at a first electronic device with a camera, one or more IR transmitters, one or more processors, and memory coupled to the one or more processors. The method includes operating the first electronic device in a first mode, the first mode including illuminating an environment proximate the first electronic device via at least one of the one or more IR transmitters to generate an image, via the camera, of at least a portion of the environment. The method further includes operating the first electronic device in a second mode, the second mode including communicating information to a second electronic device via at least one of the one or more IR transmitters.

20 Claims, 25 Drawing Sheets

(56) References Cited

U.S. PATENT DOCUMENTS

| | | | |
|---|---|---|---|
| 2009/0099736 A1* | 4/2009 | Hawes | B60R 21/0134 |
| | | | 701/46 |
| 2012/0184215 A1* | 7/2012 | Malinen | H04B 17/23 |
| | | | 455/41.3 |
| 2013/0131836 A1 | 5/2013 | Katz | |
| 2013/0338804 A1 | 12/2013 | Sheen | |
| 2014/0168362 A1* | 6/2014 | Hannuksela | H04N 13/0048 |
| | | | 348/43 |

* cited by examiner

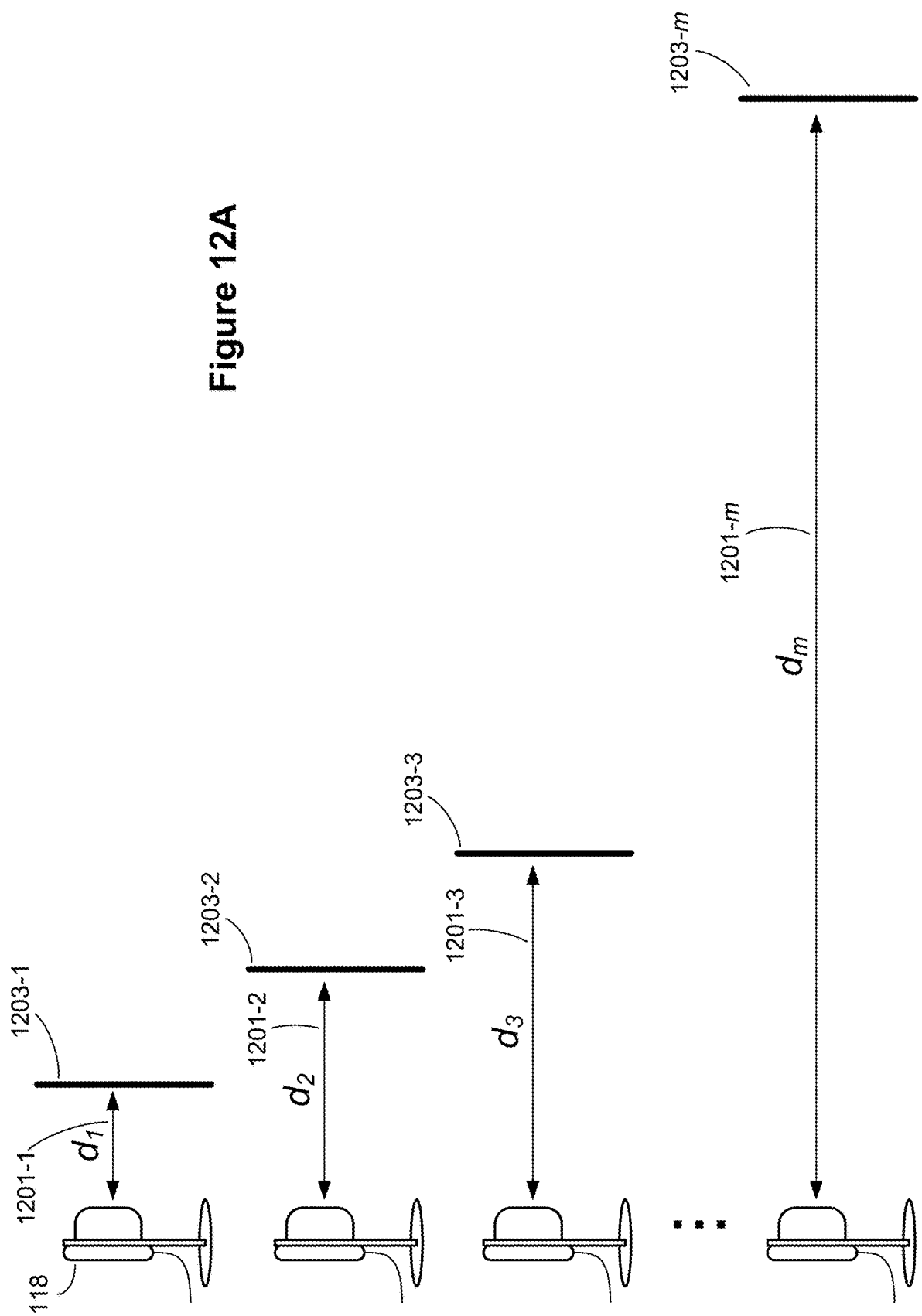

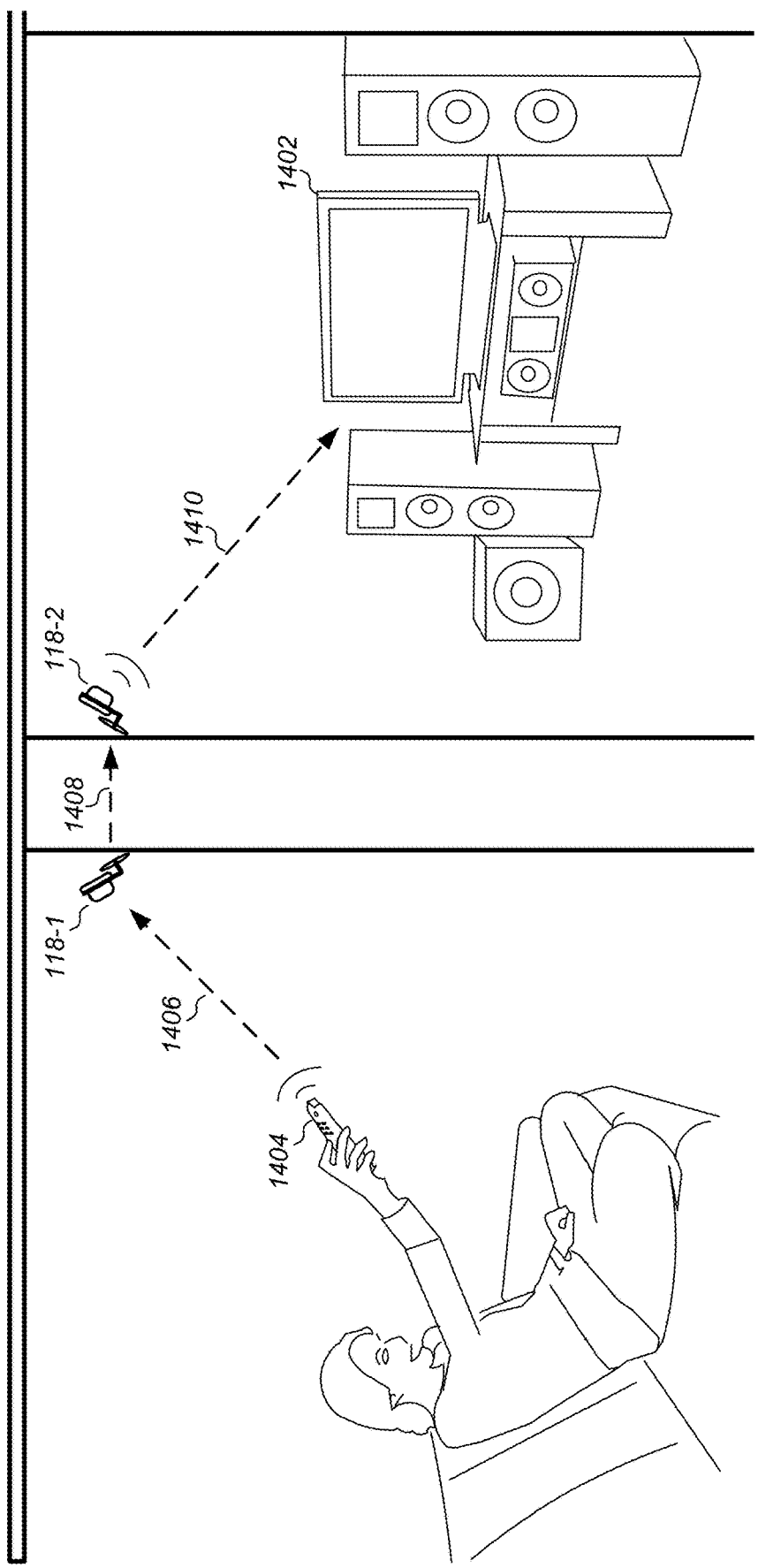

DEVICES AND METHODS FOR REPURPOSING IR TRANSMITTERS

TECHNICAL FIELD

This relates generally to multifunctional IR transmitters, including but not limited to, utilizing IR transmitters for illumination and communication.

BACKGROUND

Video surveillance cameras are used extensively. Usage of video cameras in residential environments has increased substantially, in part due to lower prices and simplicity of deployment. In many cases, surveillance cameras include infrared (IR) emitters in order to illuminate a scene when light from other sources is limited or absent.

In addition, electronic devices with IR receivers, such as home entertainment systems and/or heating, ventilation, and air conditioning (HVAC) systems, are also used extensively in residential environments.

It is a challenge to operate these electronic devices in an efficient, intuitive, and convenient manner. Human-friendly techniques for interacting with these electronic devices are in great need.

SUMMARY

Accordingly, there is a need for systems and/or devices with more efficient and intuitive methods for interacting with electronic devices via IR. In various implementations, the disclosed systems, devices, and methods complement or replace conventional systems, devices, and methods for interacting with electronic devices via IR.

(A1) In one aspect, some implementations include a method performed at a first electronic device with a camera, one or more IR transmitters, one or more processors, and memory coupled to the one or more processors. The method includes operating the first electronic device in a first mode, the first mode including illuminating an environment proximate the first electronic device via at least one of the one or more IR transmitters to generate an image, via the camera, of at least a portion of the environment. The method further includes operating the first electronic device in a second mode, the second mode including communicating information to a second electronic device via at least one of the one or more IR transmitters.

(A2) In some implementations of the method of A1, the one or more IR transmitters comprise one or more light-emitting diodes (LEDs).

(A3) In some implementations of the method of any one of A1-A2, the method further includes (1), while operating the first electronic device in the second mode, receiving a signal from a third electronic device; and (2) transmitting an IR signal corresponding to the received signal via the one or more IR transmitters.

(A4) In some implementations of the method of A3: (1) the received signal comprises an IR signal; and (2) transmitting the IR signal corresponding to the received signal via the one or more IR transmitters comprises transmitting the IR signal with a signal strength greater than a signal strength of the received signal.

(A5) In some implementations of the method of any one of A3-A4, the received signal comprises an IR signal and the IR signal is received via the camera.

(A6) In some implementations of the method of any one of A3-A4, the received signal comprises an IR signal and the IR signal is received via an IR receiver of the first electronic device.

(A7) In some implementations of the method of A3, the received signal comprises an RF signal and is received via an RF receiver of the first electronic device.

(A8) In some implementations of the method of any one of A3-A7, the third electronic device is one of: (1) a remote control (e.g., an IR or RF remote); and (2) a mobile phone.

(A9) In some implementations of the method of any one of A1-A8, illuminating the environment proximate the first electronic device via the at least one of the one or more IR transmitters comprises utilizing the one or more IR transmitters to provide illumination for the camera in accordance with a determination that a light level meets a predefined criterion.

(A10) In some implementations of the method of A9, the predefined criterion comprises a low light threshold.

(A11) In some implementations of the method of any one of A1-A10, the method further comprises operating the first electronic device in a third mode, the third mode including utilizing the one or more IR transmitters to construct a depth map for a scene corresponding to a field of view of the camera.

(A12) In some implementations of the method of any one of A1-A11, the method further comprises: (1) at the first electronic device: (a) receiving an IR signal (e.g., via an IR camera); (b) generating a non-IR signal corresponding to the IR signal (e.g., Bluetooth, Wi-Fi, and the like); and (c) transmitting the non-IR signal to a third electronic device; and (2) at the third electronic device (e.g., an IR camera with IR LEDs): (a) receiving the non-IR signal; (b) reconstructing the IR signal based on the non-IR signal; and (c) transmitting the reconstructed IR signal (e.g., via a plurality of IR LEDs).

(A13) In some implementations of the method of any one of A1-A12, the method further comprises: (1) at a hub device: (a) receiving a request to send an IR signal to the second electronic device; (b) determining which electronic device from a plurality of associated electronic devices is best-suited to send the IR signal to the second electronic device; and (c) in accordance with a determination that the first electronic device is best-suited, relaying the request to the first electronic device; and (2) at the first electronic device: (a) receiving the relayed request; (b) generating the IR signal based on the relayed request; and (c) transmitting the generated IR signal to the second electronic device.

In yet another aspect, some implementations include a system including one or more processors and memory coupled to the one or more processors, the memory storing one or more programs configured to be executed by the one or more processors, the one or more programs including instructions for performing any of the methods described herein (e.g., A1-A13 described above).

In yet another aspect, some implementations include a non-transitory computer-readable storage medium storing one or more programs for execution by one or more processors of a device, the one or more programs including instructions for performing any of the methods described herein (e.g., A1-A13 described above).

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 12A-12C illustrate a process of building a lookup table for depth estimation in accordance with some implementations.

FIGS. 14A-14B illustrate environments and systems for relaying IR commands via one or more camera devices, in accordance with some implementations.

Like reference numerals refer to corresponding parts throughout the several views of the drawings.

DESCRIPTION OF IMPLEMENTATIONS

Figure 1:
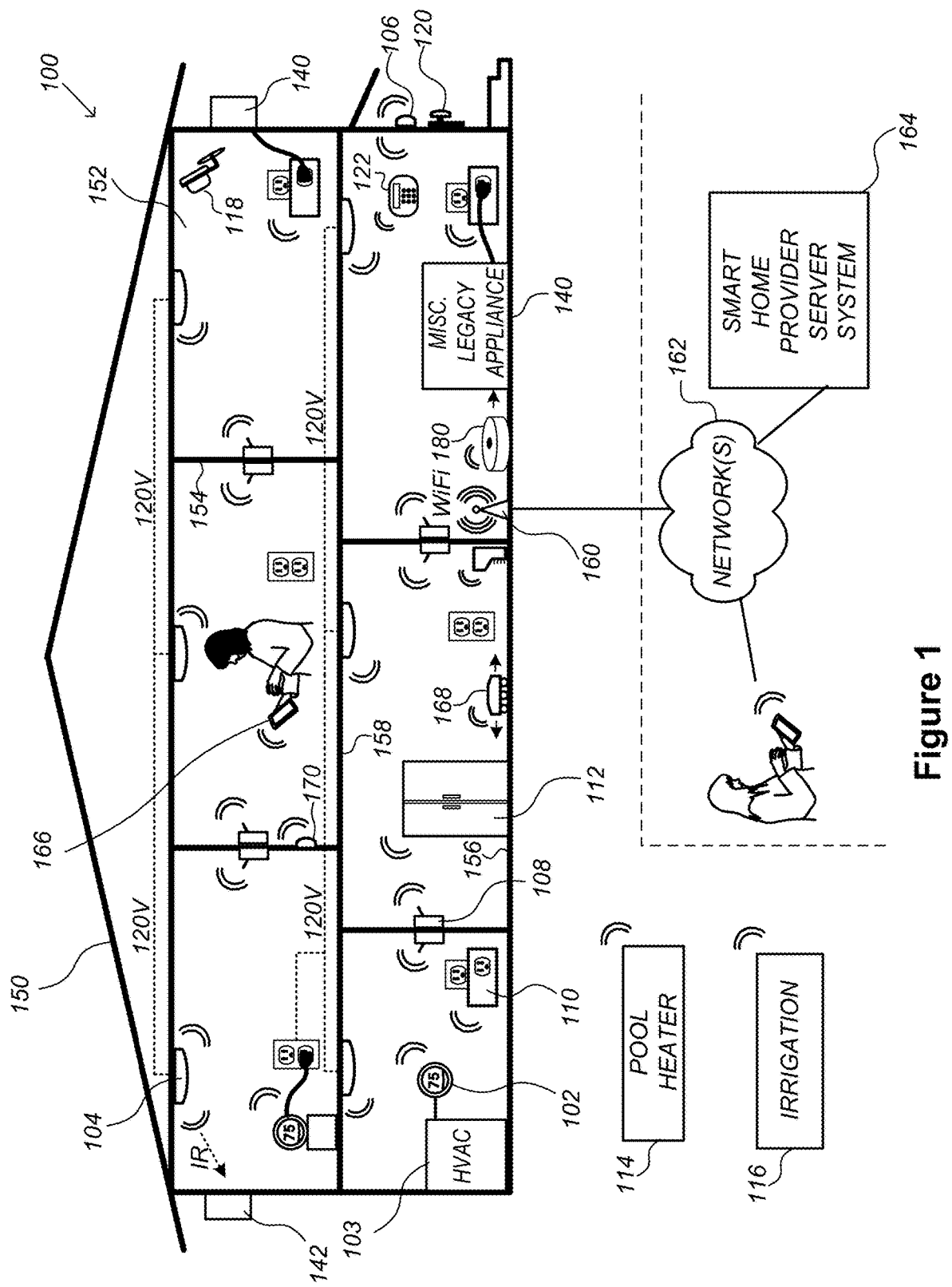
FIG. 1 is an example smart home environment, in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not necessarily the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally to any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor. In some implementations, the HVAC system 103 includes one or more window units and/or one or more ductless splits.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view the status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device.

Figure 2:
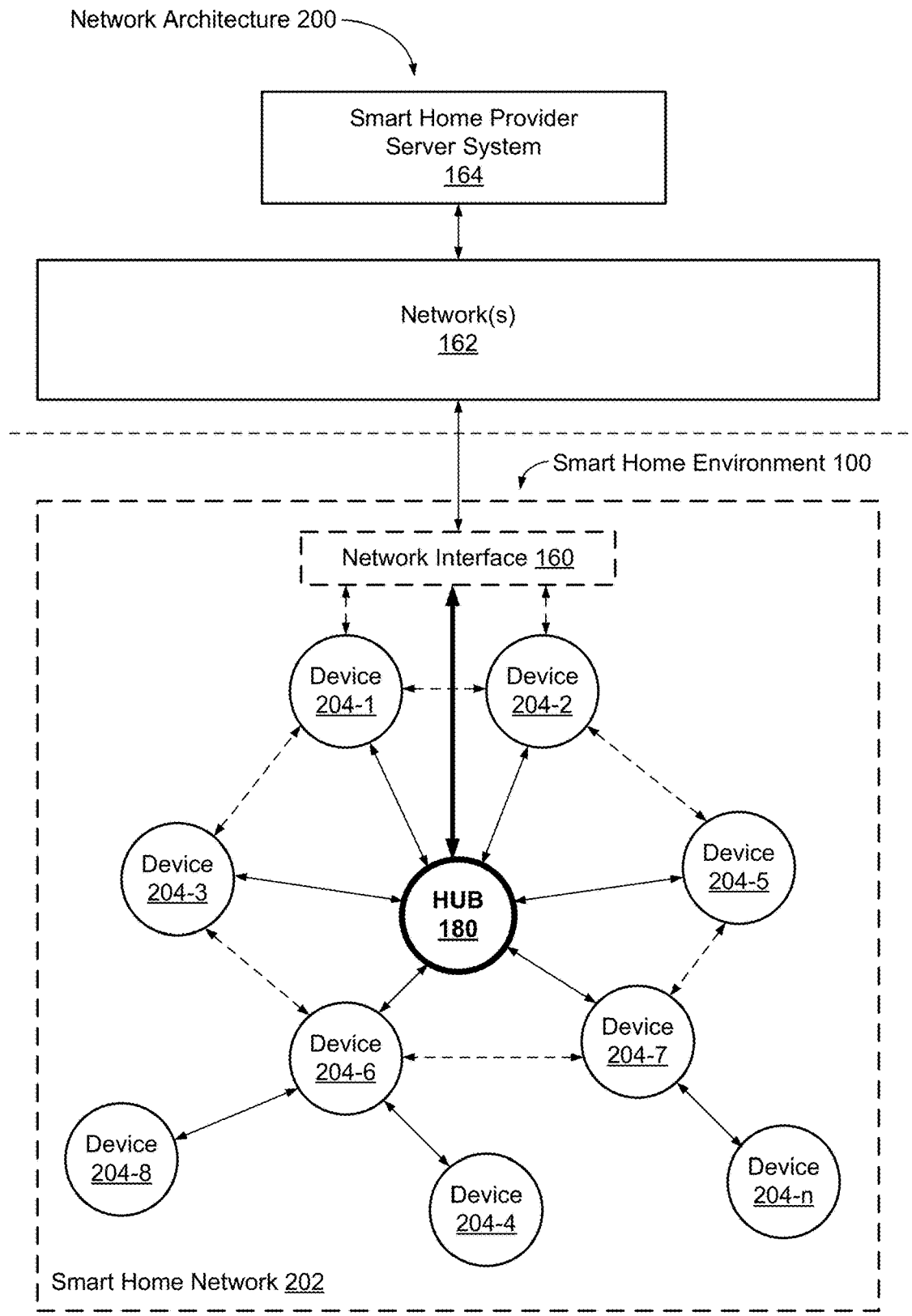
FIG. 2 is a block diagram illustrating an example network architecture that includes a smart home network, in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
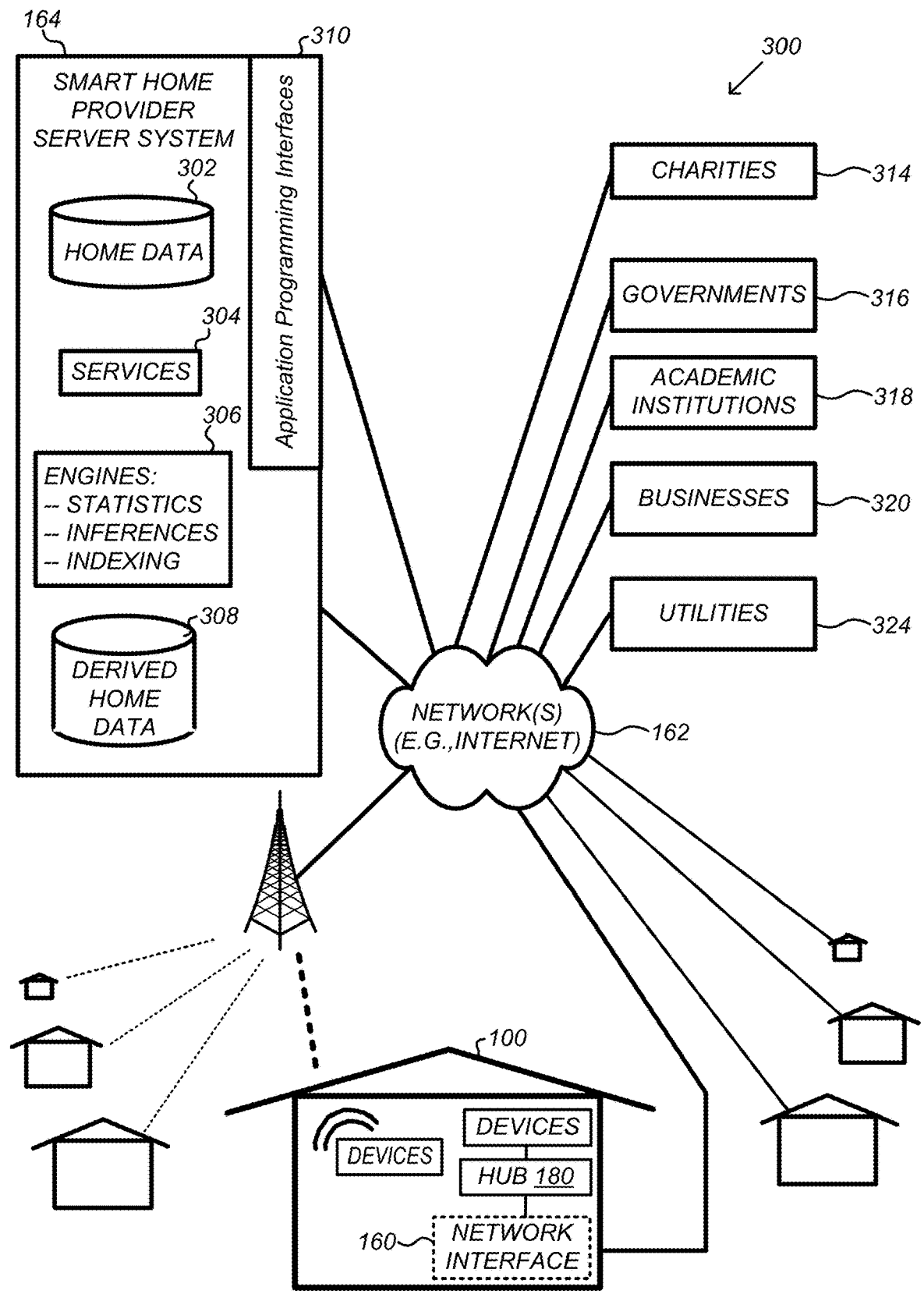
FIG. 3 illustrates a network-level view of an extensible devices and services platform with which the smart home environment of FIG. 1 is integrated, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a web page to a user of the device, or to other non-smart device entities. In some implementations, usage statistics (e.g., relative to use of other devices), usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
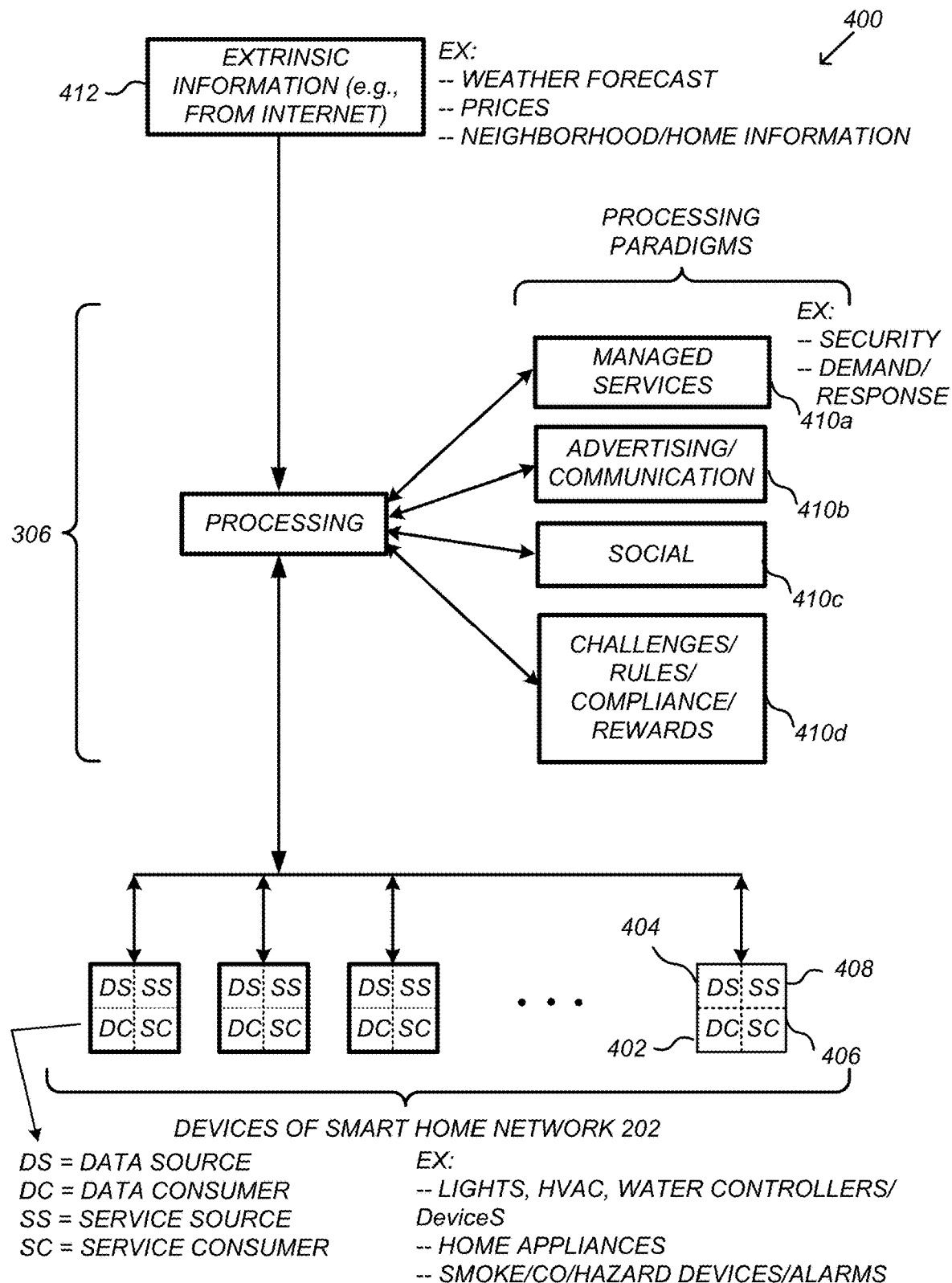
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
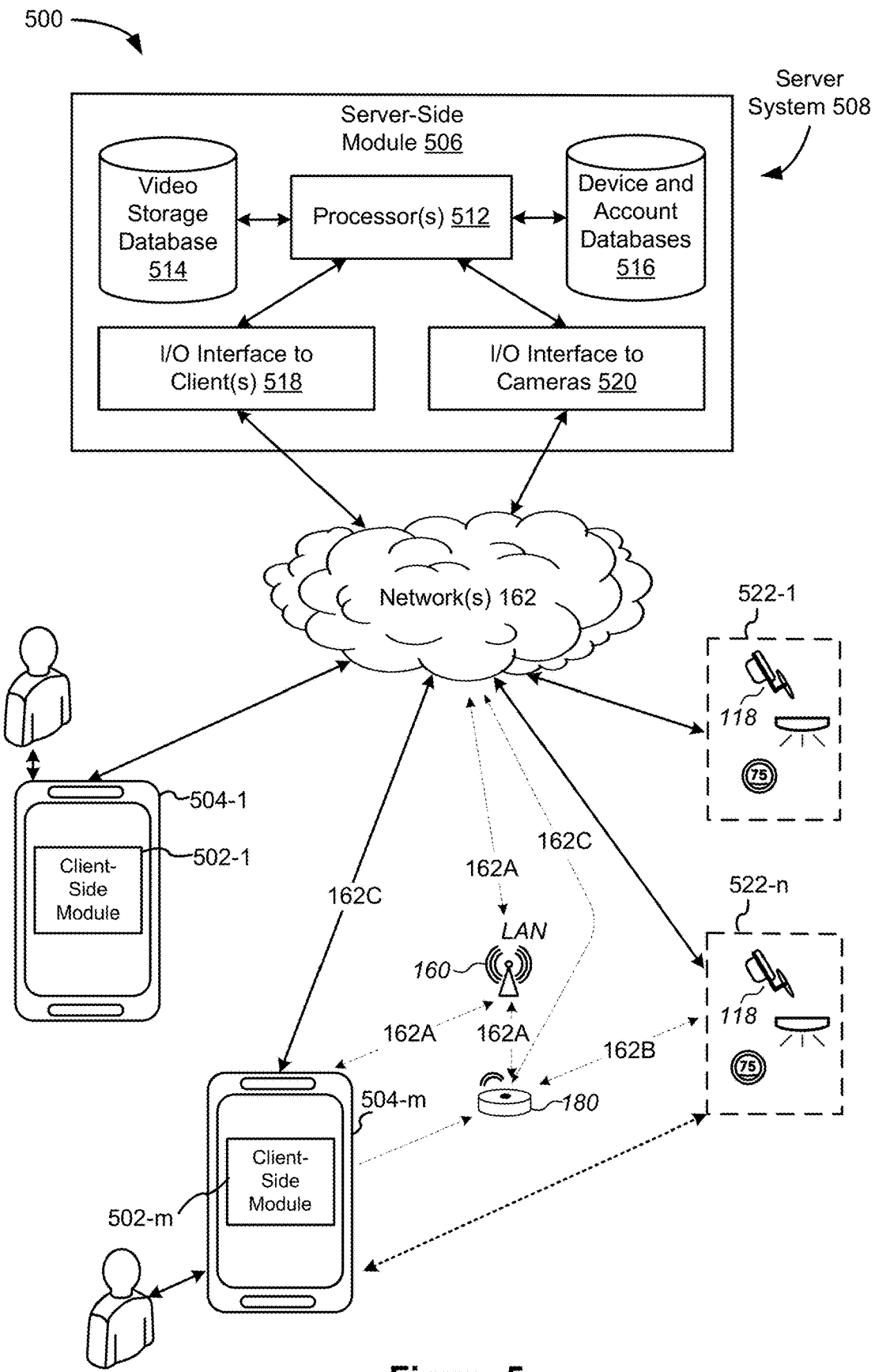
FIG. 5 is a representative operating environment in which a server system interacts with client devices and hub devices communicatively coupled to local smart devices, in accordance with some implementations.

FIG. 5 illustrates a representative operating environment 500 in which a server system 508 (also sometimes called a "hub device server system," "video server system," or "hub server system") provides data processing for monitoring and facilitating review of motion events in video streams captured by video cameras 118. As shown in FIG. 5, the server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the server system 508. In some implementations, the server system 508 is a dedicated video processing server that provides video processing services to video sources and client devices 504 independent of other services provided by the server system 508.

In some implementations, each of the video sources 522 includes one or more video cameras 118 that capture video and send the captured video to the server system 508 substantially in real-time. In some implementations, each of the video sources 522 optionally includes a controller device (not shown) that serves as an intermediary between the one or more cameras 118 and the server system 508. The controller device receives the video data from the one or more cameras 118, optionally, performs some preliminary processing on the video data, and sends the video data to the server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the server system 508.

As shown in FIG. 5, in accordance with some implementations, each of the client devices 504 includes a client-side module 502. The client-side module 502 communicates with a server-side module 506 executed on the server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 508 is implemented on one or more standalone data processing apparatuses or a distributed network of computers. In some implementations, the server system 508 also employs various virtual devices and/or services of third party service providers (e.g., third-party cloud service providers) to provide the underlying computing resources and/or infrastructure resources of the server system 508. In some implementations, the server system 508 includes, but is not limited to, a handheld computer, a tablet computer, a laptop computer, a desktop computer, or a combination of any two or more of these data processing devices, or other data processing devices.

The server-client environment 500 shown in FIG. 5 includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the server system 508 can vary in different implementations. For example, in some implementations, client-side module 502 is a thin-client that provides only user-facing input and output processing functions, and delegates all other data processing functionalities to a backend server (e.g., the server system 508). Similarly, in some implementations, a respective one of the video sources 522 is a simple video capturing device that continuously captures and streams video data to the server system 508 without no or limited local preliminary processing on the video data. Although many aspects of the present technology are described from the perspective of the server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the server system 508, the client device 504, and the video sources 522 cooperatively.

It should be understood that operating environment 500 that involves the server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices, and the server system communicate with each other using the one or more communication networks 162. In an example smart home environment, two or more devices (e.g., the network interface device 160, the hub device 180, and the client devices 504-*m*) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-*n* exchange data with the hub device 180. Alternatively, in some situations, some of the electronic devices of the video sources 522-*n* communicate with the network interface device 160 directly via the same sub-network 162A that couples devices 160, 180 and 504-*m*. In some implementations (e.g., in the network 162C), both the client device 504-*m* and the electronic devices of the video sources 522-*n* communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-*n*. As explained above, the network interface device 160 and the hub device 180 optionally communicate with each other via a sub-network 162A.

Figure 6A:
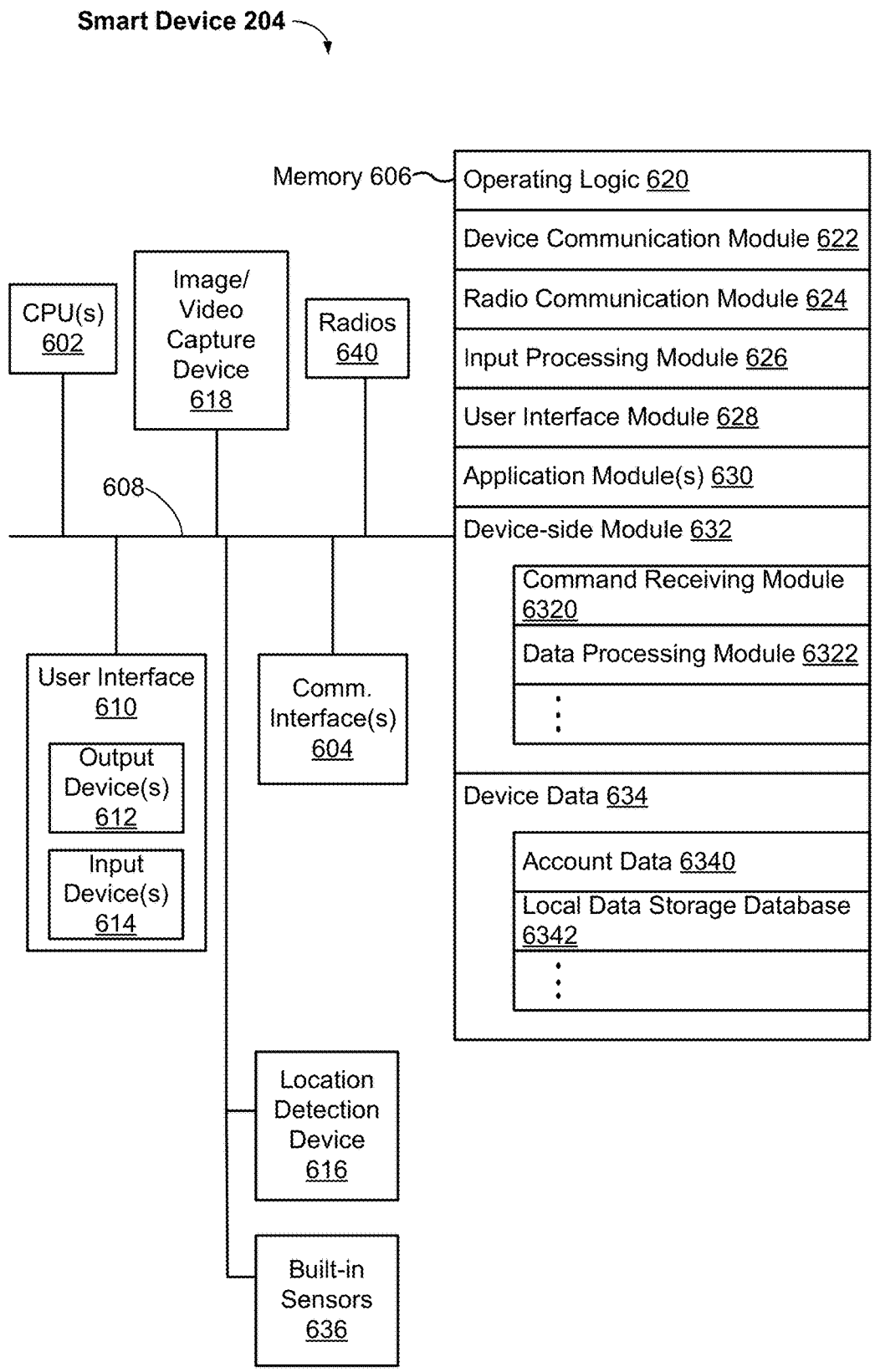
FIG. 6A is a block diagram illustrating a representative smart device, in accordance with some implementations.

FIG. 6A is a block diagram illustrating a representative smart device 204 in accordance with some implementations. In some implementations, the smart device 204 (e.g., any devices of a smart home environment 100, FIGS. 1 and 2) includes one or more processing units (e.g., CPUs, ASICs, FPGAs, microprocessors, and the like) 602, one or more communication interfaces 604, memory 606, radios 640, and one or more communication buses 608 for interconnecting these components (sometimes called a chipset).

In some implementations, the smart device 204 includes a user interface 610. In some implementations, the user interface 610 includes one or more output devices 612 that enable presentation of media content, including one or more speakers and/or one or more visual displays. In some implementations, user interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard.

In some implementations, the smart device 204 includes one or more image/video capture devices 618 (e.g., cameras, video cameras, scanners, photo sensor units). Optionally, the client device includes a location detection device 616, such as a GPS (global positioning satellite) or other geo-location receiver, for determining the location of the smart device 204.

In some implementations, the smart device 204 includes one or more built-in sensors 636. In some implementations, the built-in sensors 636 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 640 enable one or more radio communication networks in the smart home environments, and allow a smart device 204 to communicate with other devices. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 604 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

- operating logic 620 including procedures for handling various basic system services and for performing hardware dependent tasks;
- device communication module 622 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);
- radio communication module 624 for connecting the smart device 204 to other devices (e.g., controller devices, smart devices 204 in smart home environment 100, client devices 504) via one or more radio communication devices (e.g., radios 640)
- input processing module 626 for detecting one or more user inputs or interactions from the one or more input devices 614 and interpreting the detected inputs or interactions;
- user interface module 628 for providing and displaying a user interface in which settings, captured data, and/or other data for one or more devices (e.g., the smart device 204, and/or other devices in smart home environment 100) can be configured and/or viewed;
- one or more applications 630 for execution by the smart device 204 (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);

device-side module 632, which provides device-side functionalities for device control, data processing and data review, including but not limited to:

command receiving module 6320 for receiving, forwarding, and/or executing instructions and control commands (e.g., from a client device 504, from a smart home provider server system 164, from user inputs detected on the user interface 610, etc.) for operating the smart device 204;

data processing module 6322 for processing data captured or received by one or more inputs (e.g., input devices 614, image/video capture devices 618, location detection device 616), sensors (e.g., built-in sensors 636), interfaces (e.g., communication interfaces 604, radios 640), and/or other components of the smart device 204, and for preparing and sending processed data to a device for review (e.g., client devices 504 for review by a user); and device data 634 storing data associated with devices (e.g., the smart device 204), including, but is not limited to:

account data 6340 storing information related to user accounts loaded on the smart device 204, wherein such information includes cached login credentials, smart device identifiers (e.g., MAC addresses and UUIDs), user interface settings, display preferences, authentication tokens and tags, password keys, etc.; and local data storage database 6342 for selectively storing raw or processed data associated with the smart device 204 (e.g., video surveillance footage captured by a camera 118).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, memory 606, optionally, stores a subset of the modules and data structures identified above. Furthermore, memory 606, optionally, stores additional modules and data structures not described above.

Figure 6B:
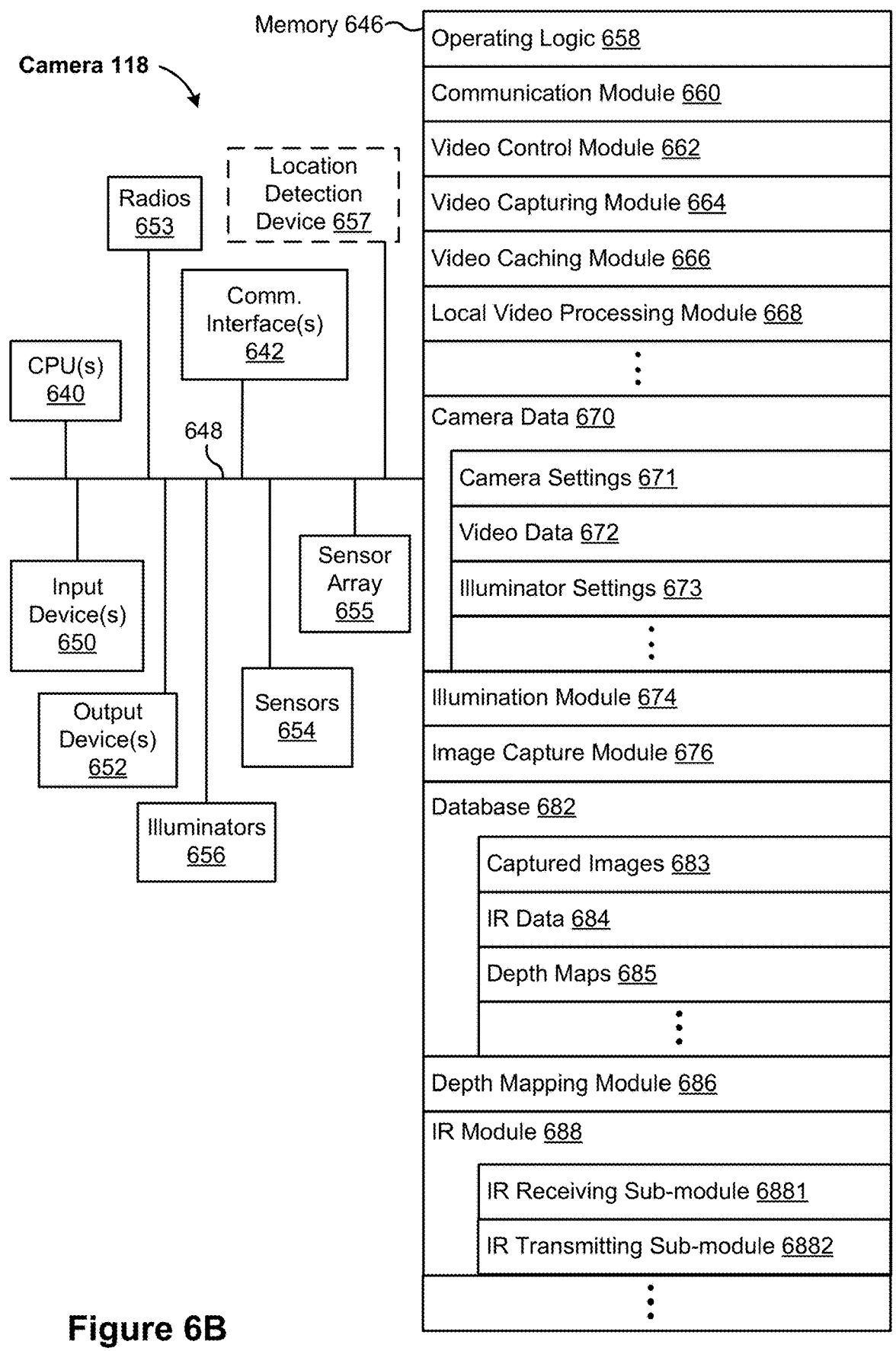
FIG. 6B is a block diagram illustrating a representative camera system, in accordance with some implementations.

FIG. 6B is a block diagram illustrating a representative camera system 118 in accordance with some implementations. Sometimes the camera system 118 is referred to herein as a "camera" 118. In some implementations, the camera system 118 is a particular type of smart device 204 (FIG. 6A) and, optionally, includes one or more of the components described above with respect to the smart devices 204, such as the components shown in FIG. 6A.

In some implementations, the camera system 118 includes one or more processing units 640 (e.g., CPUs, ASICs, FPGAs, or microprocessors), one or more communication interfaces 642, memory 646, and one or more communication buses 648 for interconnecting these components (sometimes called a chipset). In some implementations, the camera 118 includes one or more input devices 650 such as one or more buttons for receiving input and one or more microphones. In some implementations, the camera 118 includes one or more output devices 652 such as one or more indicator lights, a sound card, a speaker, a small display for displaying textual information and error codes, etc. In some implementations, input device(s) 650 and output device(s) 652 comprise a user interface such as user interface 610 (FIG. 6A). In some implementations, the camera 118 includes a location detection device 657, such as a GPS (global positioning satellite) or other geo-location receiver, for determining the location of the camera 118.

The camera 118 also includes a sensor array 655 that captures video images, and a plurality of illuminators 656, which, among other things, illuminate a scene when there is insufficient ambient light. In some implementations, the illuminators emit infrared (IR) light. In some implementations, the camera 118 includes one or more optional sensors 654, such as a proximity sensor, a motion detector, an accelerometer, an IR receiver, and a gyroscope.

In some implementations, the camera includes one or more radios 653. In some implementations, the radios 653 include an RF receiver. The radios 653 enable radio communication networks in the smart home environment and allow the camera 118 to communicate wirelessly with smart devices using one or more of the communication interfaces 642. In some implementations, communication interfaces 642 include at least one of an IR receiver and an RF receiver. In some implementations, the radios 653 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.), custom or standard wired protocols (e.g., Ethernet, HomePlug, etc.), and/or any other suitable communication protocol.

The communication interfaces 642 include, for example, hardware capable of data communications (e.g., with home computing devices, network servers, etc.), using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, USB, etc.), or any other suitable communication protocol.

The memory 646 includes high-speed random access memory, such as DRAM, SRAM, DDR RAM, or other random access solid state memory devices. In some implementations, the memory 646 includes non-volatile memory, such as one or more magnetic disk storage devices, one or more optical disk storage devices, one or more flash memory devices, or one or more other non-volatile solid state storage devices. The memory 646, or alternatively the non-volatile memory within the memory 646, comprises a non-transitory computer readable storage medium. In some implementations, the memory 646, or the non-transitory computer readable storage medium of the memory 646, stores the following programs, modules, and data structures, or a subset or superset thereof:

operating system 658, which includes procedures for handling various basic system services and for performing hardware dependent tasks;

network communication module 660, which connects the camera 118 to other computing devices (e.g., the server system 508, a client device 504, network routing devices, one or more controller devices, and networked storage devices) connected to the one or more networks 162 via the one or more communication interfaces 642 (wired or wireless);

video control module 662, which modifies the operation mode (e.g., zoom level, resolution, frame rate, recording and playback volume, lighting adjustment, AE and IR modes, etc.) of the camera 118, enabling/disabling the audio and/or video recording functions of the camera 118, changing the pan and tilt angles of the camera 118, resetting the camera 118, and so on;

video capturing module 664, which captures and generates a video stream. In some implementations, the video capturing module sends the video stream to the server system 508 as a continuous feed or in short bursts;

video caching module 666, which stores some or all captured video data locally at one or more local storage devices (e.g., memory, flash drives, internal hard disks, portable disks, etc.);

local video processing module 668, which performs preliminary processing of the captured video data locally at the camera 118. For example, in some implementations, the local video processing module 668 compresses and encrypts the captured video data for network transmission, performs preliminary motion event detection, performs preliminary false positive suppression for motion event detection, and/or performs preliminary motion vector generation;

camera data 670, which in some implementations includes one or more of:
  camera settings 671, including network settings, camera operation settings, camera storage settings, etc.;
  video data 672, including video segments and motion vectors for detected motion event candidates to be sent to the server system 508; and
  illuminator settings 673, including power settings, brightness settings, modes of operation, directional settings, and the like. In some implementations, the illuminator settings 673 include settings for each of a plurality of different operating modes.

illumination module 674, which controls the illuminators 656. In some implementations, the illumination module 674 identifies low-light conditions and turns on illuminators as needed. In some implementations, the illumination module controls the illuminators 656 individually. Some implementations store one or more illumination patterns, which are used when the illumination module is used in conjunction with the depth mapping module 686. In some implementations, the illumination module 674 is used in conjunction with the IR module 688 to transmit IR signals via the illuminators 656;

image capture module 676, which uses the image sensor array 655 to capture images. In some implementations, the image capture module 676 can capture either IR images or RGB images. Typically, the camera 118 is capable of capturing both still images as well as video streams;

one or more databases 682, which store various data used by the camera 118. In some implementations, the database stores captured images 683, including IR images and/or RGB images. In some implementations, the image capture module 676 stores captured IR images and RGB images temporarily (e.g., in volatile memory) before being stored more permanently in the database 682. In some implementations, the database 682 stores lookup tables, which are used by the depth mapping module 686 to generate depth maps 685. In some implementations, the computed depth maps 685 are also stored in the database 682. In some implementations, the database 682 stores IR data 684, including IR command sequences for various electronic devices;

depth mapping module 686, which uses the lookup tables to build one or more depth maps 685 as described in greater detail below; and IR module 688 for processing IR signals received and/or transmitted by the camera 118. In some implementations, the IR module includes an IR receiving sub-module 6881 for processing IR signals received by the camera 118, including IR signals received via the sensor array 650 and/or communications interface 642. In some implementations, the IR module includes an IR transmitting sub-module 6882 for generating IR signals to be transmitted by the camera 118, including IR signals generated based on IR data 684 and transmitted via the illuminators 656.

In some implementations, the memory 646 includes one or more additional modules not shown in FIG. 6B, such as a lookup table generation module, which uses captured images 683 to generate lookup tables. The lookup tables are subsequently used by the depth mapping module 686 to construct depth maps 685 of a scene. In some implementations, the lookup table generation module includes a normalization module, which is used to normalize the vectors in the lookup tables.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 646 stores a subset of the modules and data structures identified above. In some implementations, the memory 646 stores additional modules and data structures not described above.

Figure 7:
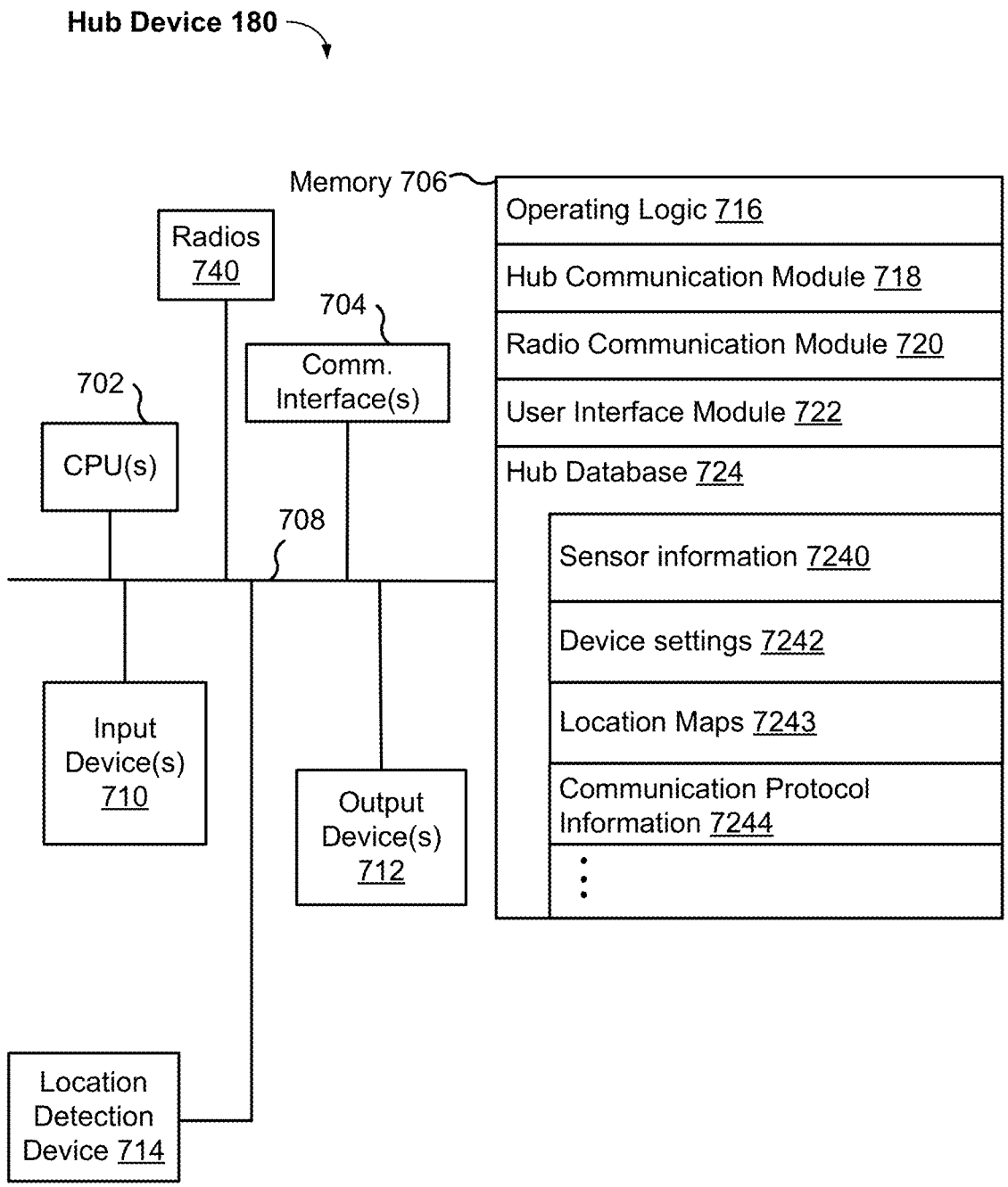
FIG. 7 is a block diagram illustrating a representative hub device, in accordance with some implementations.

FIG. 7 is a block diagram illustrating a representative hub device 180 in accordance with some implementations. In some implementations, the hub device 180 includes one or more processing units (e.g., CPUs, ASICs, FPGAs, microprocessors, and the like) 702, one or more communication interfaces 704, memory 706, radios 740, and one or more communication buses 708 for interconnecting these components (sometimes called a chipset). In some implementations, the hub device 180 includes one or more input devices 710 such as one or more buttons for receiving input. In some implementations, the hub device 180 includes one or more output devices 712 such as one or more indicator lights, a sound card, a speaker, a small display for displaying textual information and error codes, etc. Furthermore, in some implementations, the hub device 180 uses a microphone and voice recognition or a camera and gesture recognition to supplement or replace the keyboard. In some implementations, the hub device 180 includes a location detection device 714, such as a GPS (global positioning satellite) or other geo-location receiver, for determining the location of the hub device 180.

The hub device 180 optionally includes one or more built-in sensors (not shown), including, for example, one or more thermal radiation sensors, ambient temperature sensors, humidity sensors, IR sensors, IR receivers, occupancy sensors (e.g., using RFID sensors), ambient light sensors, motion detectors, accelerometers, and/or gyroscopes.

In some implementations, the hub device 180 is a particular type of smart device 204 (FIG. 6A) and, optionally, includes one or more of the components described above with respect to the smart devices 204, such as the components shown in FIG. 6A.

The radios 740 enable one or more radio communication networks in the smart home environments, and allow a hub device to communicate with smart devices. In some implementations, the radios 740 include an RF receiver. In some implementations, the radios 740 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 704 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. In some implementations, communication interfaces 704 include an IR receiver.

Memory 706 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

- operating logic 716 including procedures for handling various basic system services and for performing hardware dependent tasks;
- hub device communication module 718 for connecting to and communicating with other network devices (e.g., network interface 160, such as a router that provides Internet connectivity, networked storage devices, network routing devices, server system 508, etc.) connected to one or more networks 162 via one or more communication interfaces 704 (wired or wireless). In some implementations, the hub device communication module 718 converts signals received in a first format (e.g., RF signals) to signals in a second format (e.g., IR signals);
- radio communication module 720 for connecting the hub device 180 to other devices (e.g., controller devices, smart devices 204 in smart home environment 100, client devices 504) via one or more radio communication devices (e.g., radios 740);
- user interface module 722 for providing and displaying a user interface in which settings, captured data, and/or other data for one or more devices (e.g., smart devices 204 in smart home environment 100) can be configured and/or viewed; and
- hub device database 724, including but not limited to:
  - sensor information 7240 for storing and managing data received, detected, and/or transmitted by one or more sensors of the hub device 180 and/or one or more other devices (e.g., smart devices 204 in smart home environment 100);
  - device settings 7242 for storing operational settings for one or more devices (e.g., coupled smart devices 204 in smart home environment 100);
  - location maps 7243 for storing location information corresponding to smart home environment 100, such as location and positioning information for smart devices 204 as well as other electronic devices within the smart home environment 100 (e.g., electronic devices with IR receivers such as entertainment systems); and
  - communication protocol information 7244 for storing and managing protocol information for one or more protocols (e.g., standard wireless protocols, such as ZigBee, Z-Wave, etc., and/or custom or standard wired protocols, such as Ethernet). In some implementations, the communication protocol information 7244 is used in conjunction with the hub communication module 718 and/or radio communication module 720 to convert signals from a first protocol to a second protocol; or to generate signals in a first protocol based on signals received in a second protocol.

Each of the above identified elements (e.g., modules stored in memory 706 of hub device 180) may be stored in one or more of the previously mentioned memory devices (e.g., the memory of any of the smart devices 204 in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, memory 706, optionally, stores a subset of the modules and data structures identified above. Furthermore, memory 706, optionally, stores additional modules and data structures not described above.

Figure 8:
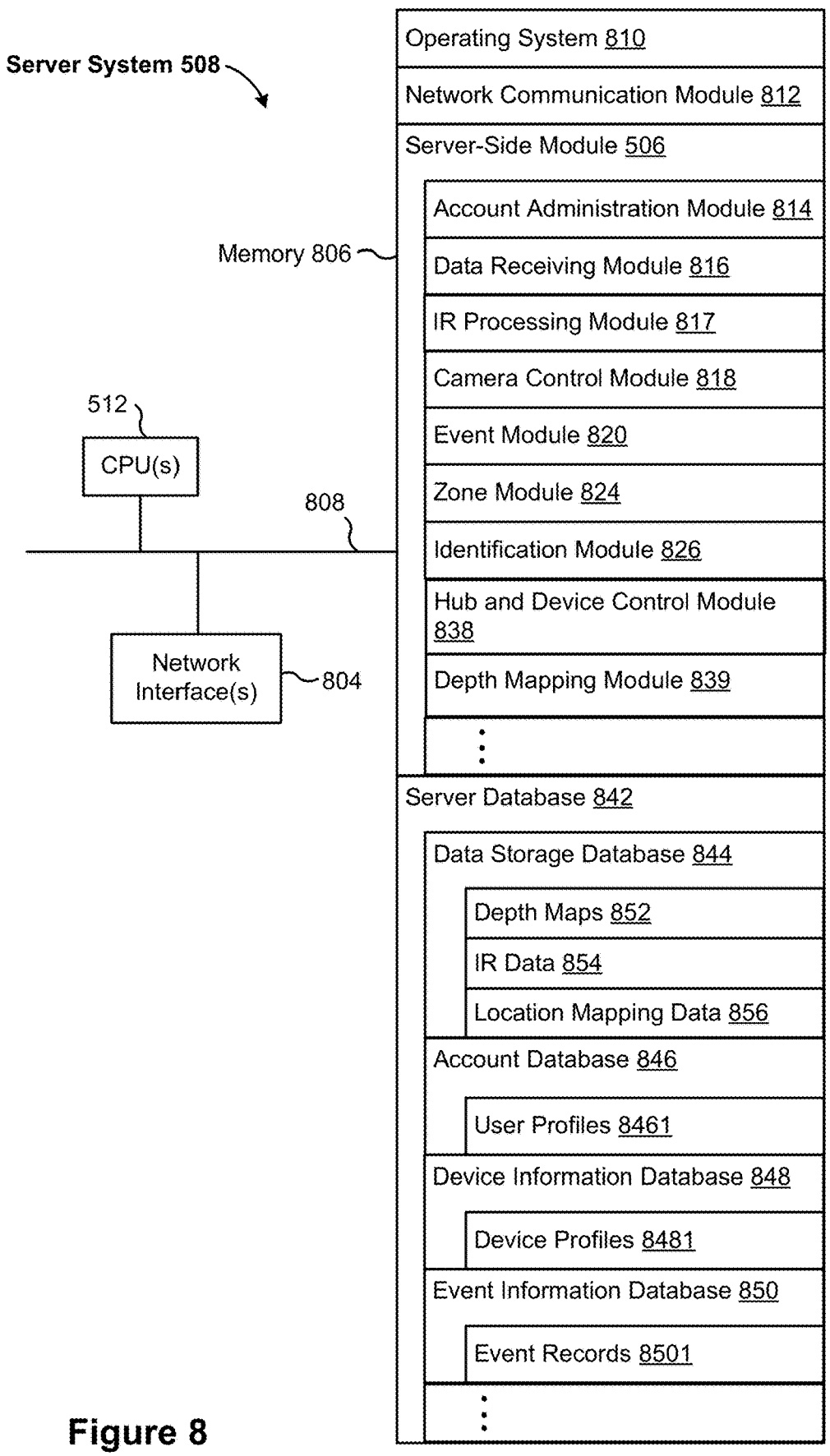
FIG. 8 is a block diagram illustrating a representative server system, in accordance with some implementations.

FIG. 8 is a block diagram illustrating the server system 508 in accordance with some implementations. The server system 508 typically includes one or more processing units (CPUs) 512, one or more network interfaces 804 (e.g., including an I/O interface to one or more client devices and an I/O interface to one or more electronic devices), memory 806, and one or more communication buses 808 for interconnecting these components (sometimes called a chipset). Memory 806 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 702. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

- operating system 810 including procedures for handling various basic system services and for performing hardware dependent tasks;
- network communication module 812 for connecting the server system 508 to other systems and devices (e.g., client devices, electronic devices, and systems connected to one or more networks 162, FIGS. 1-5) via one or more network interfaces 804 (wired or wireless);

server-side module 506, which provides server-side functionalities for device control, data processing, and data review, including, but not limited to:

account administration module 814 for creating reviewer accounts, performing camera registration processing to establish associations between video sources to their respective reviewer accounts, and providing account login-services to the client devices 504;

data receiving module 816 for receiving data from electronic devices (e.g., video data from a camera 118, FIG. 1), and preparing the received data for further processing and storage in the data storage database 7160. In some implementations, the data is received via the hub device 180;

IR processing module 817 for processing IR signals within one or more smart home environments, such as IR signals received, generated, and/or transmitted by a particular smart device 204 (e.g., the camera 118) within a particular smart home environment. In some implementations, IR processing module 817, in conjunction with IR data 854, generates IR commands based on one or more signals (e.g., RF signals) or requests.

camera control module 818 for generating and sending server-initiated control commands to modify the operation modes of the video sources, and/or receiving and forwarding user-initiated control commands to modify the operation modes of the video sources 522;

event module 820 for processing motion events. In some implementations, the event module 820 includes one or more of:

a detection module for detecting motion event candidates in video streams from each of the video sources 522, including motion track identification, false positive suppression, and event mask generation and caching;

an event categorization module for categorizing motion events detected in received video streams;

a real-time motion event presentation module for dynamically changing characteristics of event indicators displayed in user interfaces as new event filters, such as new event categories or new zones of interest, and for providing real-time notifications as new motion events are detected in the video streams; and an event post-processing module for providing summary time-lapse for past motion events detected in video streams, and providing event and category editing functions to users for revising past event categorization results.

zone module 824 for processing zones of interest. In some implementations, the zone module 824 includes one or more of:

zone creation module for generating zones of interest in accordance with user input; and zone monitoring module for monitoring motion within selected zones of interest and generating notifications for new motion events detected within the selected zones of interest, where the zone monitoring takes into account changes in the surrounding context of the zones and is not confined within the selected zones of interest;

identification module 826 for identifying persons and/or objects within a scene. In some implementations, the identification module 826 includes a person identification module for identifying characteristics associated with the presence of humans in the received video streams;

hub and device control module 838 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices; and depth mapping module 839 for generating depth maps of scenes;

Server database 842, including but not limited to:

data storage database 844 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the hub device 180 or smart devices are stored securely. In some implementations, data storage database 844 includes one or more of:

depth maps 852 for various scenes within one or more smart home environments, such as depth maps generated via depth mapping module 839 and/or depth mapping module 686 (FIG. 6B);

IR data 854 for various devices within one or more smart home environments, such as IR command sequences for various electronic devices with IR receivers within a smart home environment and/or IR data generated by an IR module 688 (FIG. 6B);

location mapping data 856 for storing location information corresponding to one or more smart home environments, such as location and positioning information for smart devices 204 within a particular smart home environment as well as location and positioning information for other electronic devices within a particular smart home environment such as electronic devices with IR receivers;

account database 846 for storing account information for user accounts, including user account information such as user profiles 8461, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;

device information database 848 for storing device information related to one or more devices such as device profiles 8481, e.g., device identifiers and hub device specific secrets, independently of whether the corresponding hub devices have been associated with any user account; and event information database 850 for storing event information such as event records 8501, e.g., event log information, event categories, and the like.

In some implementations, the memory 806 includes one or more additional modules not shown in FIG. 8, such as a data processing module for processing the data provided by the electronic devices, and/or preparing and sending processed data to a device for review (e.g., client devices 504 for review by a user). In some implementations, the data processing module includes an event processor sub-module for processing event candidates and/or events within a received video stream (e.g., a video stream from cameras 188). In some implementations, the data processing module includes an event categorizer sub-module for categorizing event candidates and/or events within the received video stream. In some implementations, the data processing module includes a user interface sub-module for communicating with a user (e.g., sending alerts, timeline events, etc. and receiving user edits and zone definitions and the like).

In some instances, a particular event record 8501 includes the data for a corresponding motion event, such as motion start (also sometimes called cuepoint) data, event segments data, raw video data, motion end data, event features data, scene features data, associated user information, and associated devices information. In some instances, the event record 8501 includes only a subset of the above data. In some instances, the event record includes additional event data such as data regarding event/motion masks.

In some instances, a particular user profile 8561 includes the data for a corresponding user associated with the smart home network (e.g., smart home network 202) such as a user of a hub device 204, a user identified by a hub device 204, a user who receives notifications from a hub device 204 or from the server system 508, and the like. In some instances, the user profile includes user preferences, user settings, associated devices information, and associated events information. In some instances, the user profile includes only a subset of the above data. In some instances, the user profile includes additional user information not shown such as information regarding other users associated with the corresponding user.

In some instances, a particular device profile 8481 includes information regarding the current settings of a corresponding device, such as positioning information, mode of operation information, environmental information, and the like. In some instances, the device settings are user-specific and are set by respective users of the device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, memory 806, optionally, stores a subset of the modules and data structures identified above. Furthermore, memory 806, optionally, stores additional modules and data structures not described above.

Figure 9:
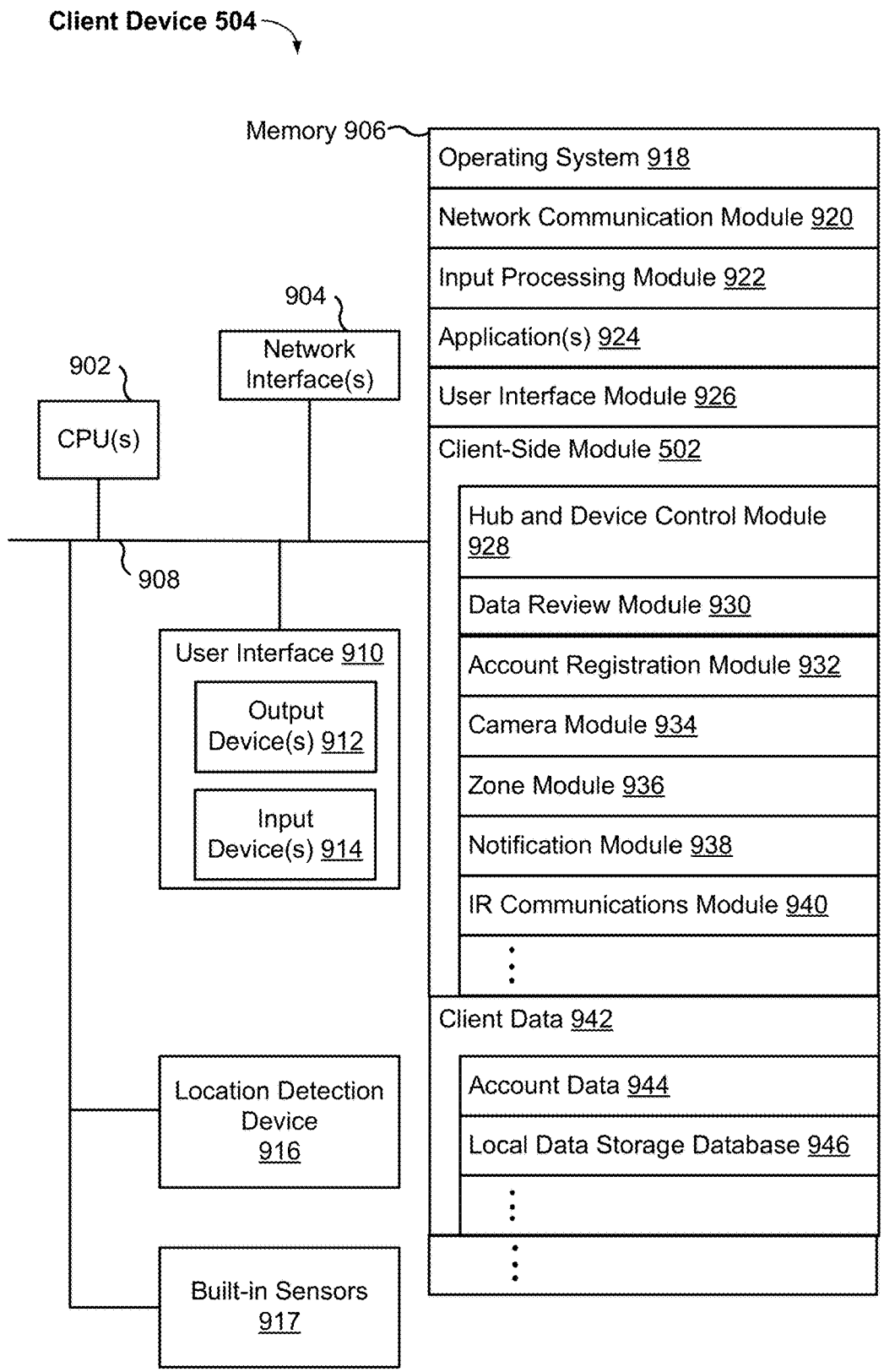
FIG. 9 is a block diagram illustrating a representative client device, in accordance with some implementations.

FIG. 9 is a block diagram illustrating a representative client device 504 associated with a user account in accordance with some implementations. The client device 504, typically, includes one or more processing units (CPUs) 902, one or more network interfaces 904, memory 906, and one or more communication buses 908 for interconnecting these components (sometimes called a chipset). Optionally, the client device also includes a user interface 910 and one or more built-in sensors 917 (e.g., accelerometer and gyroscope). In some implementations, user interface 910 includes one or more output devices 912 that enable presentation of media content, including one or more speakers and/or one or more visual displays. In some implementations, user interface 910 also includes one or more input devices 914, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 916, such as a GPS (global positioning satellite) or other geo-location receiver, for determining the location of the client device.

Memory 906 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, optionally, includes one or more storage devices remotely located from one or more processing units 902. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

- operating system 918 including procedures for handling various basic system services and for performing hardware dependent tasks;
- network communication module 920 for connecting the client device 504 to other systems and devices (e.g., client devices, electronic devices, and systems connected to one or more networks 162, FIGS. 1-5) via one or more network interfaces 904 (wired or wireless);
- input processing module 922 for detecting one or more user inputs or interactions from one of the one or more input devices 914 and interpreting the detected input or interaction;
- one or more applications 924 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);
- user interface module 926 for providing and displaying a user interface in which settings, captured data, and/or other data for one or more devices (e.g., smart devices 204 in smart home environment 100) can be configured and/or viewed;
- client-side module 502, which provides client-side functionalities for device control, data processing and data review, including but not limited to:
  - hub device and device control module 928 for generating control commands for modifying an operating mode of the hub device or the electronic devices in accordance with user inputs; and data review module 930 for providing user interfaces for reviewing data processed by the server system 508;

account registration module 932 for establishing a reviewer account and registering one or more video sources with the server system 508;

camera module 934 for interacting with various cameras 118 within a smart home environment. In some implementations, the camera module 934 includes one or more of:
- a camera setup module for setting up one or more video sources within a local area network, and enabling the one or more video sources to access the video server system 508 on the Internet through the local area network; and
- a camera control module for generating control commands for modifying an operating mode of the one or more video sources in accordance with user input.

zone module 936 for processing zones of interest. In some implementations, zone module 936 includes a zone creation module for providing a user interface for creating zones of interest for each video stream in accordance with user input, and sending the definitions of the zones of interest to the video server system 508;

notification module 938 for generating real-time notifications for all or selected motion events on the client device 504 outside of the event review user interface; and IR communications module 940 for processing IR communications received and/or transmitted by the client device;

client data 942 storing data associated with the user account and electronic devices, including, but is not limited to:
- account data 944 storing information related to both user accounts loaded on the client device and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and
- local data storage database 946 for selectively storing raw or processed data associated with electronic devices (e.g., of the video sources 522, such as a camera 118).

In some implementations, the memory 906 includes one or more additional modules not shown in FIG. 9, such as a presentation module for enabling presentation of information (e.g., user interfaces for application(s) 924 or the client-side module 502, widgets, websites and web pages thereof, and/or games, audio and/or video content, text, etc.) at the client device 504 via the one or more output devices 914 (e.g., displays, speakers, etc.) associated with the user interface 910.

As another example, in some implementations the memory 906 includes a web browser module for navigating, requesting (e.g., via HTTP), and displaying websites and web pages thereof, including a web interface for logging into a reviewer account, controlling the video sources associated with the reviewer account, establishing and selecting event filters, and editing and reviewing motion events detected in the video streams of the video sources.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in various implementations. In some implementations, memory 906, optionally, stores a subset of the modules and data structures identified above. Furthermore, memory 906, optionally, stores additional modules and data structures not described above.

In some implementations, at least some of the functions of the camera 118 are performed by a client device 504, the hub device 180, the server system 508, and/or one or more other smart devices 204, and the corresponding sub-modules of these functions may be located within the client device 504, the server system 508, and/or other smart devices 204, rather than the camera 118. Similarly, in some implementations, at least some of the functions of the client device, the hub device, the server system, and/or smart devices are performed by the camera 118, and the corresponding sub-modules of these functions may be located within the camera 118. For example, in some implementations, a camera 118 captures an IR image of an illuminated scene (e.g., using the illumination module 674 and the image capture module 676), while a server system 508 stores the captured images (e.g., in the video storage database 514) and creates a depth map 685 based on the captured images (e.g., performed by a depth mapping module stored in the memory of server system 508). The server system 508, the client device 504, hub device 180, smart device 204, and the camera system 118, shown in FIGS. 6-9 are merely illustrative, and different configurations of the modules for implementing the functions described herein are possible in various implementations.

Figure 10:
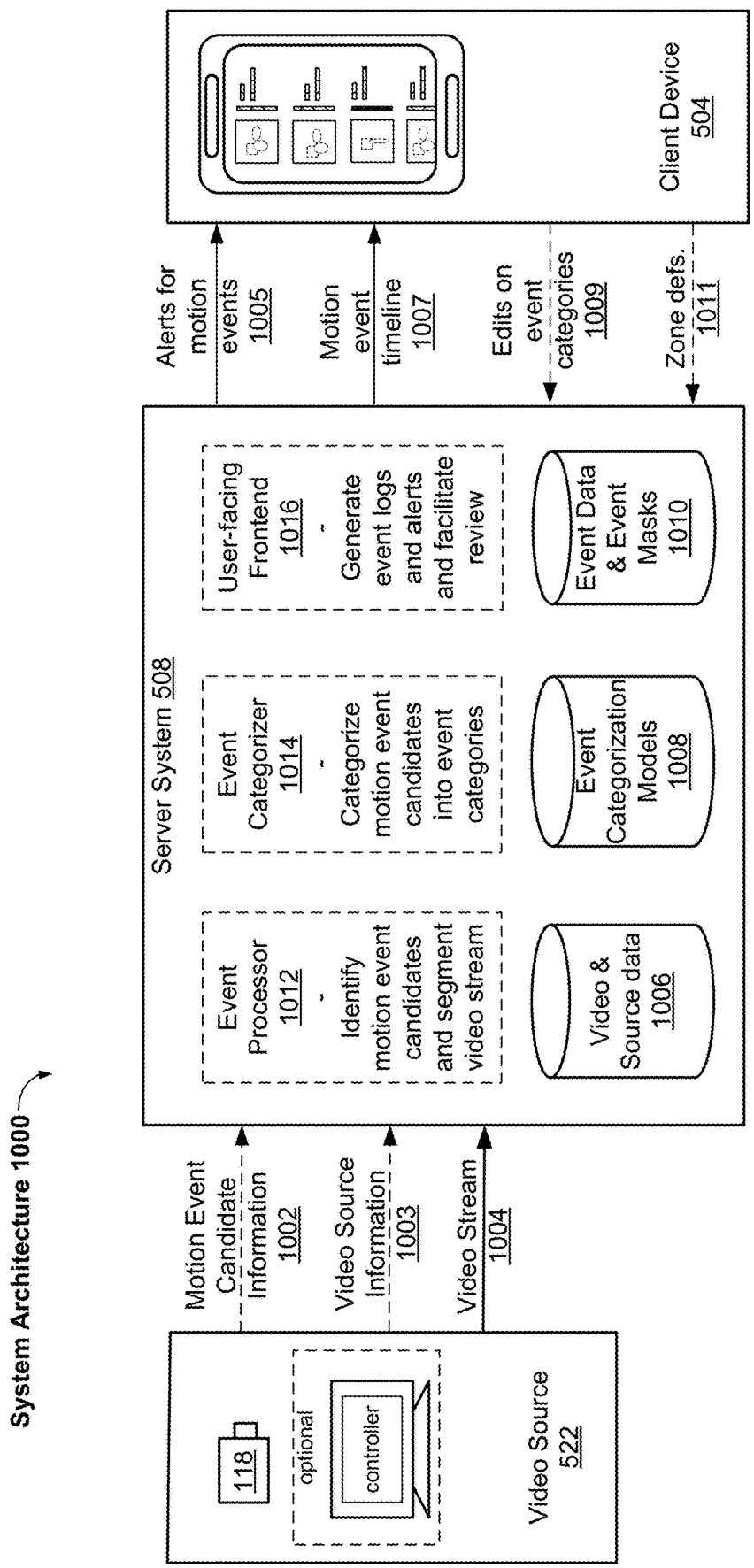
FIG. 10 illustrates a representative system architecture for video analysis and categorization, in accordance with some implementations.

FIG. 10 illustrates a representative system architecture for video analysis and categorization, in accordance with some implementations. In some implementations, the server system 508 includes functional modules for an event processor 1012, an event categorizer 1014, and a user-facing frontend 1016. The event processor 1012 obtains the motion event candidates (e.g., by processing the video stream or by receiving the motion start information from the video source 522). The event categorizer 1014 categorizes the motion event candidates into different event categories. The user-facing frontend 1016 generates event alerts and facilitates review of the motion events by a reviewer through a review interface on a client device 504. The client facing frontend also receives user edits on the event categories, user preferences for alerts and event filters, and zone definitions for zones of interest. The event categorizer optionally revises event categorization models and results based on the user edits received by the user-facing frontend. The server system 508 also includes a video and source data database 1006, event categorization modules database 1008, and event data and event masks database 1010. In some implementations, each of these databases is part of the server database 842 (e.g., part of data storage database 844).

The server system 508 receives the video stream 1004 from the video source 522 and optionally receives motion event candidate information 1002 such as motion start information and video source information 1003 such as device settings for camera 118 (e.g., a device profile 8481 for camera 118). In some implementations, the event processor sub-module 1012 communicates with the video source 522. The server system sends alerts for motion events 1005 and motion event timeline information 1007 to the client device 504. The server system 508 optionally receives user information from the client device 504 such as edits on event categories 1009 and zone definitions 1011.

The data processing pipeline processes a live video feed received from a video source 522 (e.g., including a camera 118 and an optional controller device) in real-time to identify and categorize motion events in the live video feed, and sends real-time event alerts and a refreshed event timeline to a client device 504 associated with a reviewer account bound to the video source 522. The data processing pipeline also processes stored video feeds from a video source 522 to reevaluate and/or re-categorize motion events as necessary, such as when new information is obtained regarding the motion event and/or when new information is obtained regarding motion event categories (e.g., a new activity zone is obtained from the user).

After video data is captured at the video source 522, the video data is processed to determine if any potential motion event candidates are present in the video stream. A potential motion event candidate detected in the video data is also sometimes referred to as a cuepoint. Thus, the initial detection of a motion event candidate is referred to as motion start detection and/or cuepoint detection. Motion start detection triggers performance of a more thorough event identification process on a video segment (also sometimes called a "video slice" or "slice") corresponding to the motion event candidate. In some implementations, the video data is initially processed at the video source 522. Thus, in some implementations, the video source sends motion event candidate information, such as motion start information, to the server system 508. In some implementations, the video data is processed at the server system 508 for motion start detection. In some implementations, the video stream is stored on server system 508 (e.g., in video and source data database 1006). In some implementations, the video stream is stored on a server distinct from server system 508. In some implementations, after a cuepoint is detected, the relevant portion of the video stream is retrieved from storage (e.g., from video and source data database 1006).

In some implementations, the more thorough event identification process includes segmenting the video stream into multiple segments then categorizing the motion event candidate within each segment. In some implementations, categorizing the motion event candidate includes an aggregation of background factors, motion entity detection identification, motion vector generation for each motion entity, motion entity features, and scene features to generate motion features for the motion event candidate. In some implementations, the more thorough event identification process further includes categorizing each segment, generating or updating a motion event log) based on categorization of a segment, generating an alert for the motion event based on categorization of a segment, categorizing the complete motion event, updating the motion event log based on the complete motion event, and generating an alert for the motion event based on the complete motion event. In some implementations, a categorization is based on a determination that the motion event candidate is within a particular zone of interest. In some implementations, a categorization is based on a determination that the motion event candidate involves one or more particular zones of interest.

The event analysis and categorization process may be performed by the video source 522 and the server system 508 cooperatively, and the division of the tasks may vary in different implementations, for different equipment capability configurations, and/or for different network and server load situations. After the server system 508 categorizes the motion event candidate, the result of the event detection and categorization may be sent to a reviewer associated with the video source 522.

In some implementations, the server system 508 also determines an event mask for each motion event candidate and caches the event mask for later use in event retrieval based on selected zone(s) of interest.

In some implementations, the server system 508 stores raw or compressed video data (e.g., in a video and source data database 1006), event categorization models (e.g., in an event categorization model database 1008), and event masks and other event metadata (e.g., in an event data and event mask database 1010) for each of the video sources 522. In some implementations, the video data is stored at one or more display resolutions such as 480p, 780p, 1080i, 1080p, and the like.

Figure 11A:
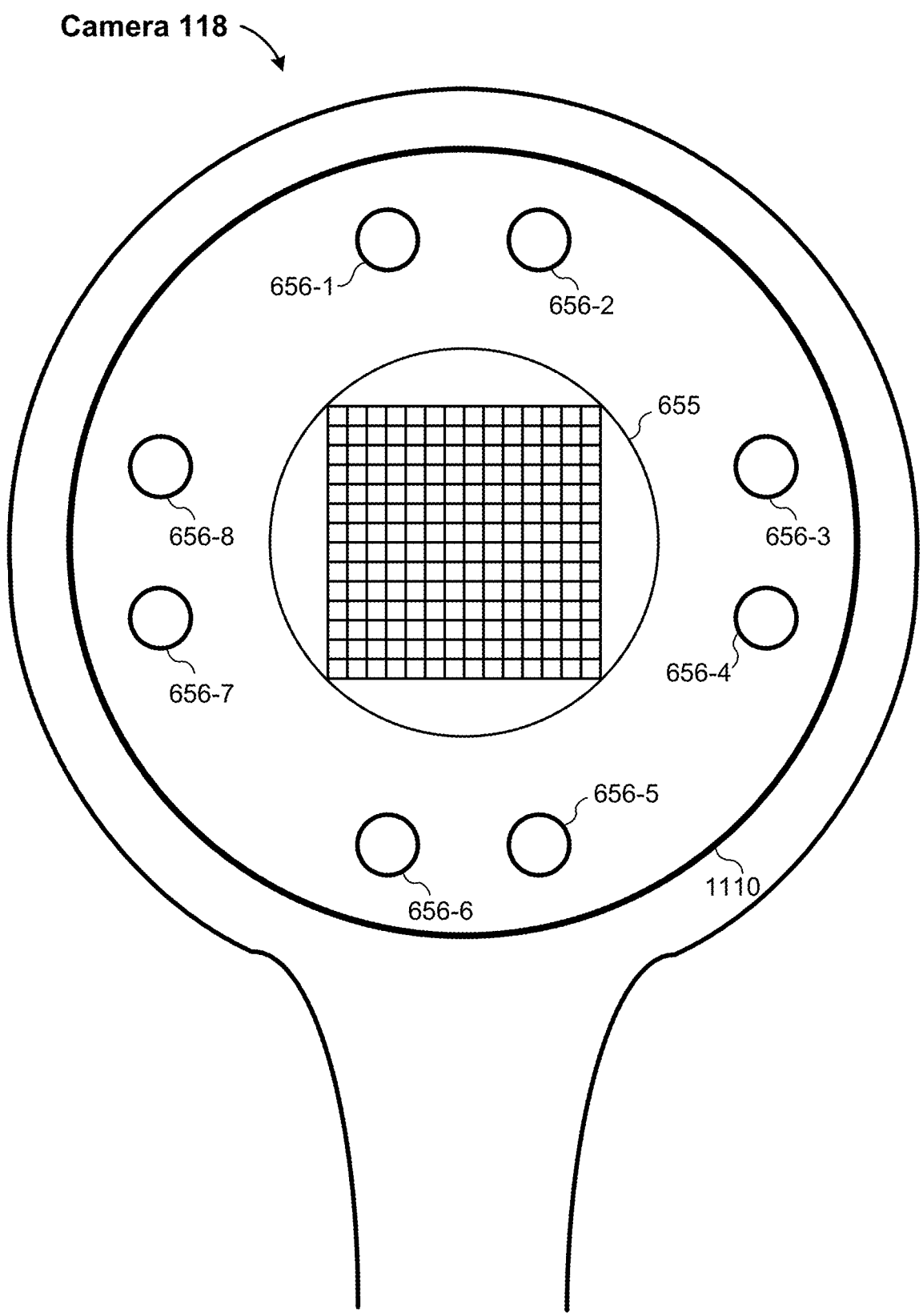
FIGS. 11A-11C illustrate representative illuminators and array of memory sensors for a camera device, in accordance with some implementations.

FIG. 11A provides a front view of a camera 118, in accordance with some implementations. The camera 118 includes a sensor array 655, a plurality of illuminators 656 (e.g., the illuminators 656-1 to 656-8, sometimes also called "transmitters"), and an enclosure 1110. In this particular implementation, the array 655 of image sensors (which are typically photodiodes) is centrally located and rectangular, but this configuration is not required. An actual image sensor array 655 typically has a much higher resolution than shown in the illustration. In this implementation, there are eight illuminators that are grouped into four pairs, with one pair for each of: top, bottom, left, and right. In other implementations, there are more of fewer illuminators, and the illuminators may be grouped in different ways (or not grouped at all). In some implementations, the camera 118 includes camera circuitry and/or other camera components that are not illustrated in this figure.

As described in greater detail below, the illuminators 656 are activated to illuminate a scene by emitting streams of light (e.g., infrared light). During illumination, light rays are scattered by and reflect off of object surfaces in the scene (e.g., walls, furniture, humans, etc.). Reflected light rays are then detected by the sensor array 655, which captures an image of the scene (e.g., an IR image and/or an RGB image). In some implementations, the captured image digitally measures the intensity of the reflected IR light for each of the pixels in the sensor array 655.

In some implementations, the illuminators 656 are light emitting diodes. In some implementations, the illuminators 656 are semiconductor lasers or other semiconductor light sources. In some implementations, the illuminators 656 are configured to emit light spanning a broad range of the electromagnetic spectrum, including light in the IR range (e.g., 700 nm to 1 mm), the visible light range (e.g., 400 nm-700 nm), and/or the ultraviolet range (e.g., 10 nm-400 nm). In some implementations, a portion of the illuminators 656 are configured to emit light in a first range (e.g., IR range), while other illuminators 656 are configured to emit light in a second range (e.g., visible light range). In some implementations, the illuminators 656 are configured to emit light in accordance with one or more predefined illumination patterns. For example, in some implementations, the illumination pattern is circular round-robin in a clockwise order. In some of these implementations, the round-robin pattern activates two illuminators at a time. An illumination pattern may specify other parameters as well, such as the length of time each illuminator is activated, the output power (e.g., measured in watts), or other parameters.

The sensor array 655 converts an optical image (e.g., reflected light rays) into an electric signal. In some implementations, the sensor array 655 is a CCD image sensor, a CMOS sensor, or another type of light sensor device (e.g., a hybrid of CCD and CMOS). The sensor array 655 includes a plurality of individual light-sensitive sensors. In some implementations, the sensors of the sensor array 655 are arranged in a rectangular grid pattern as illustrated in FIG. 11A. Upon exposure to light, each sensor of the sensor array 655 detects a measurable and proportional value corresponding to the light intensity. In some implementations, the sensor array 655 or other camera circuitry converts the measured value (e.g., current) into a digital value. In some implementations, the sensor array 655 or the enclosure 1110 includes an IR filter to remove wavelengths of incident light that fall outside of a predefined range. For example, some implementations use an IR filter that passes only light having wavelengths in the range of 810 nm to 870 nm. In some implementations, the illuminators 656 emit light at a specified wavelength and the light reaching the sensor array is filtered to correspond to the specified wavelength of the illuminators.

In some implementations, the camera 118 includes additional camera components, such as one or more lenses, image processors, shutters, and/or other components known to those skilled in the art of digital photography.

In some implementations, the camera 118 also includes camera circuitry for coordinating various image capture functionality of the camera 118. In some implementations, the camera circuitry is coupled to the illuminators 656, to the sensor array 655, and/or to other camera components, and coordinates the operational timing of the various camera device components. In some implementations, when capturing an IR image of a scene, the camera circuitry activates a subset of the illuminators 656, activates the sensor array 655 to capture the image, and determines an appropriate shutter speed to manage the image exposure. In some implementations, the camera circuitry performs basic image processing of raw images captured by the sensor array 655 during the exposure. The image processing includes filtering and conversion of a produced voltage or current at the sensor array 655 into a digital value.

Figure 11B:
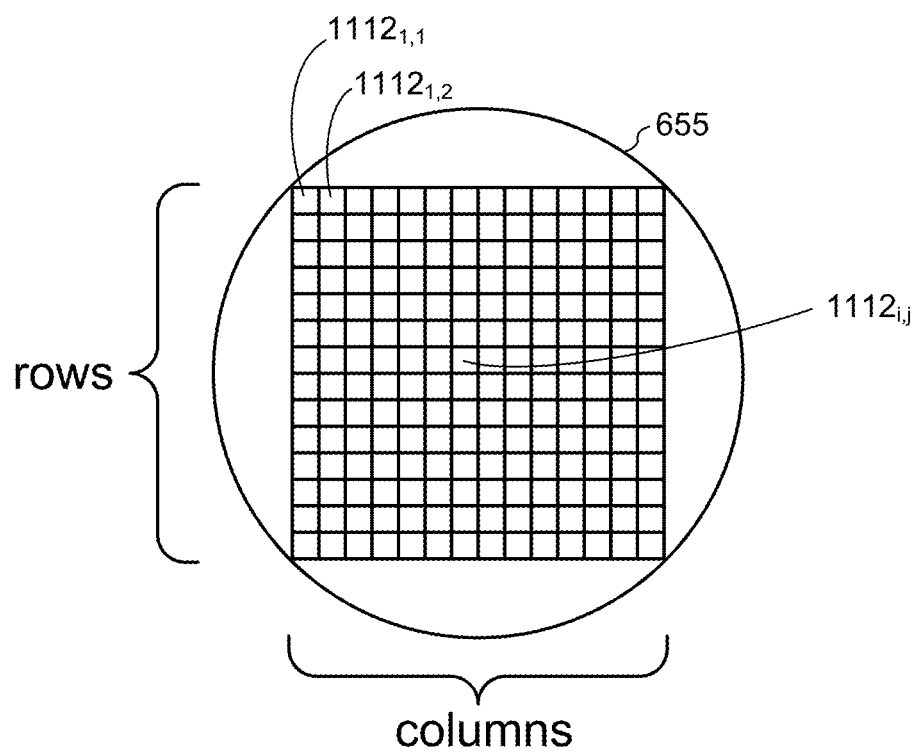

FIG. 11B illustrates just the image sensor array 655 for a camera 118. In this example, the sensors 1112 in the sensor array 655 are in a rectangular grid of rows and columns. In the illustration, the rectangular grid is a square, but other implementations have grids of sensors 1112 that are not square (e.g., more sensors horizontally than vertically). Also, the sensors 1112 themselves are not necessarily square. In this example, the first row consists of a line of sensors $1112_{1,1}$, $1112_{1,2}$, . . . . The sensor in the ith row and jth column is labeled $1112_{i,j}$.

Figure 11C:
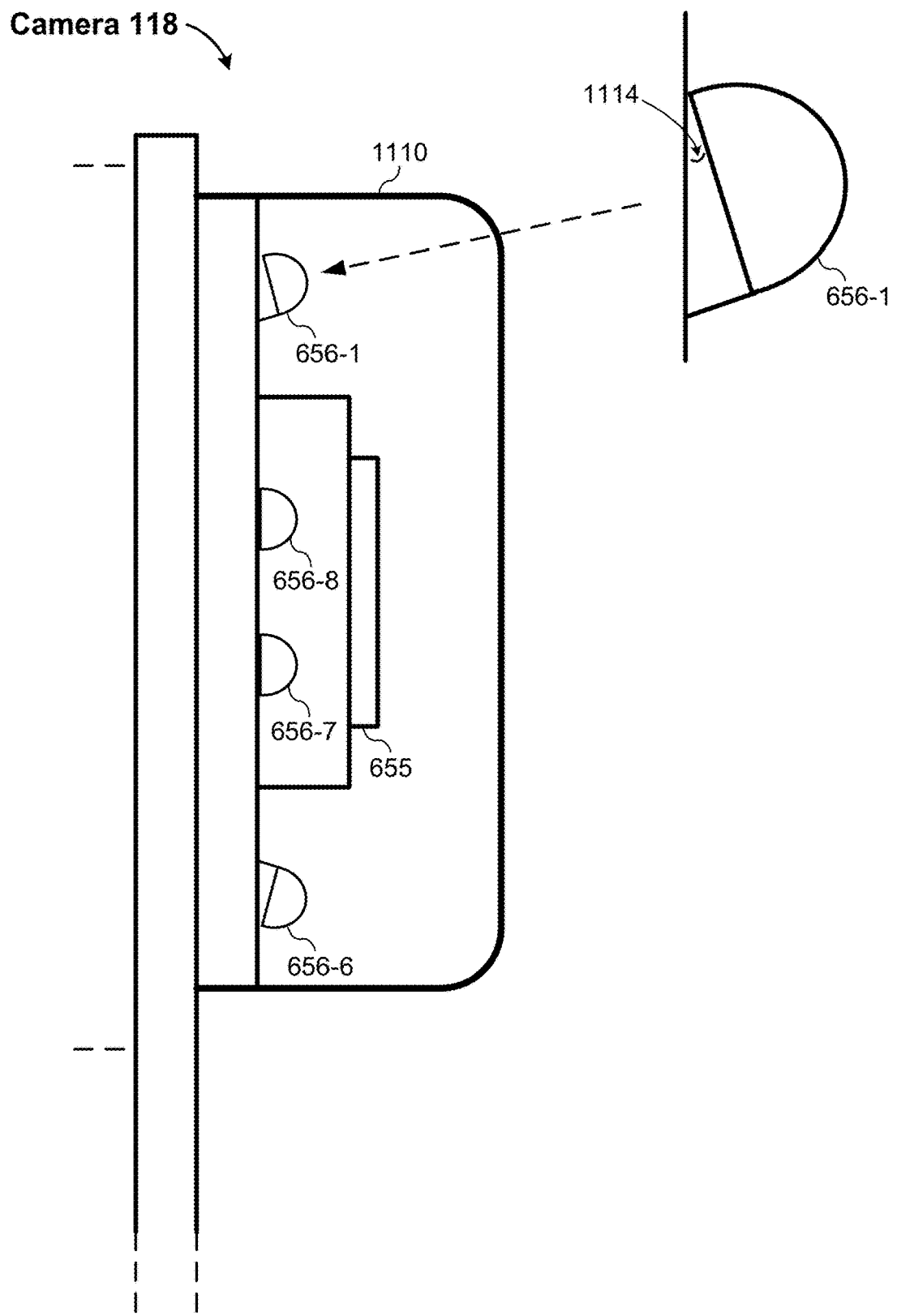

FIG. 11C provides a side view of a camera 118, in accordance with some implementations. The same components of the camera 118 in FIG. 11A are illustrated in FIG. 11C: the illuminators 656, the sensor array 655, and the enclosure 1110.

Figure 13A:
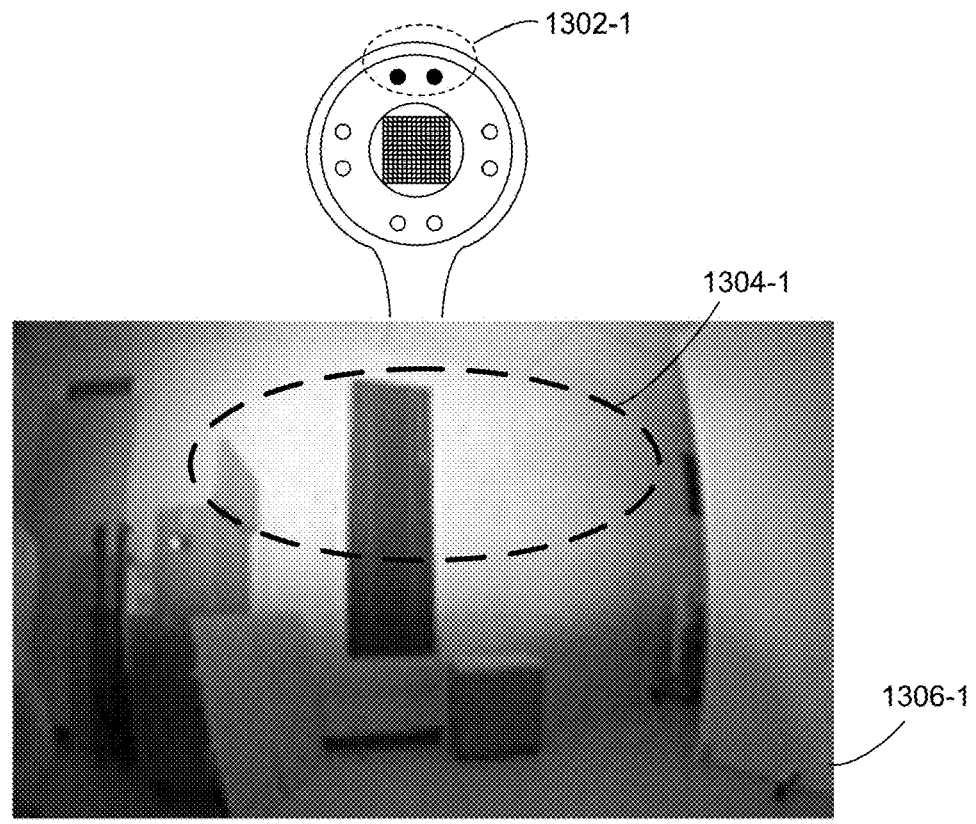
FIGS. 13A-13D illustrate a process of creating a depth map using a sequence of captured IR images in accordance with some implementations.
Figure 13B:
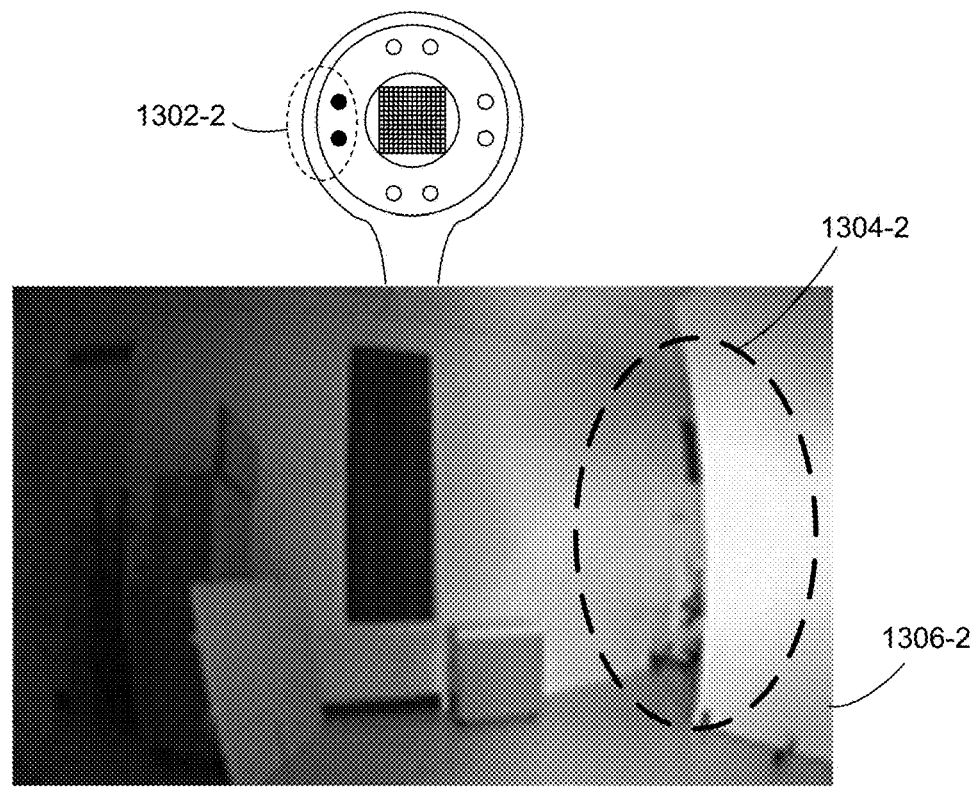
Figure 13C:
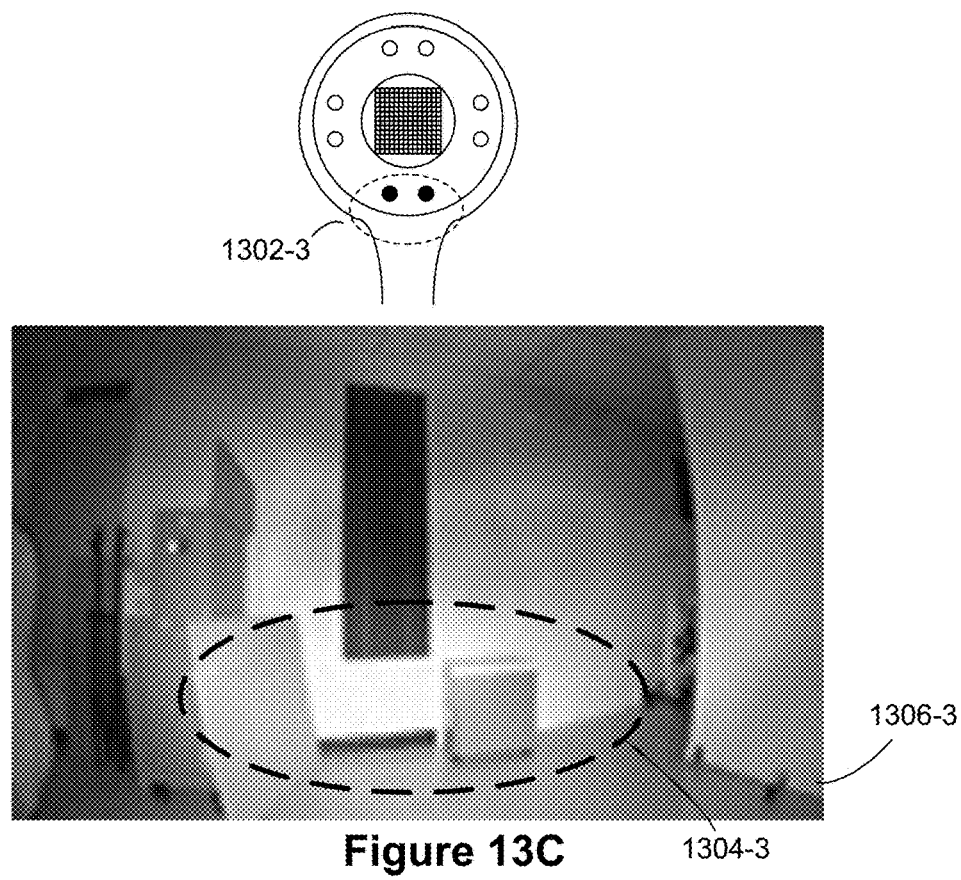
Figure 13D:
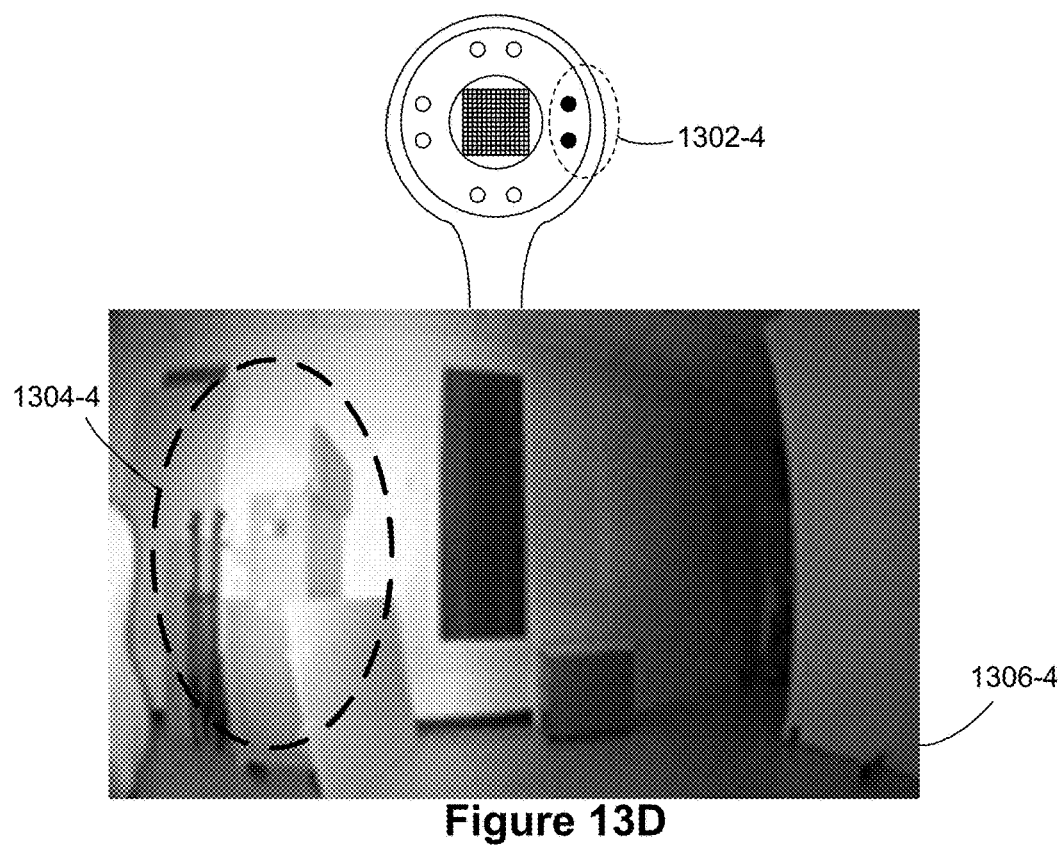

In some implementations, one or more illuminators 656 are angled relative to the planar axis of the sensor array, such as illuminator 656-1 in FIG. 11C. By positioning the illuminators 656 at respective angles (e.g., angle 1114), portions of a scene will be illuminated at greater or lesser intensities depending on which of the illuminators 656 are activated and the angles at which the activated illuminators are positioned. FIGS. 13A-13D illustrate a sequence of IR images with different illuminators activated. For example, FIG. 13A is an image captured with the top two illuminators activated, whereas FIG. 13C is an image captured with the bottom two illuminators activated.

Figure 12B:
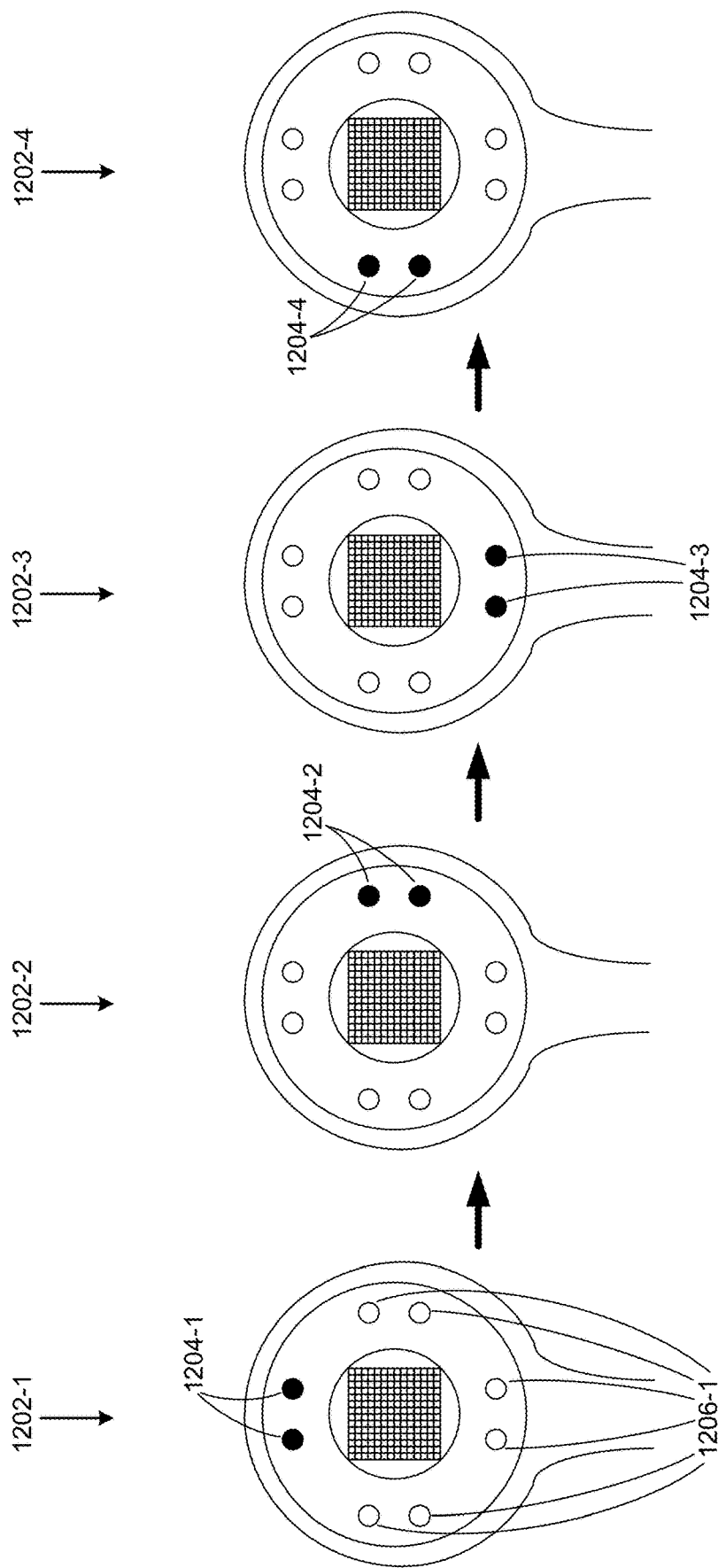
Figure 12C:
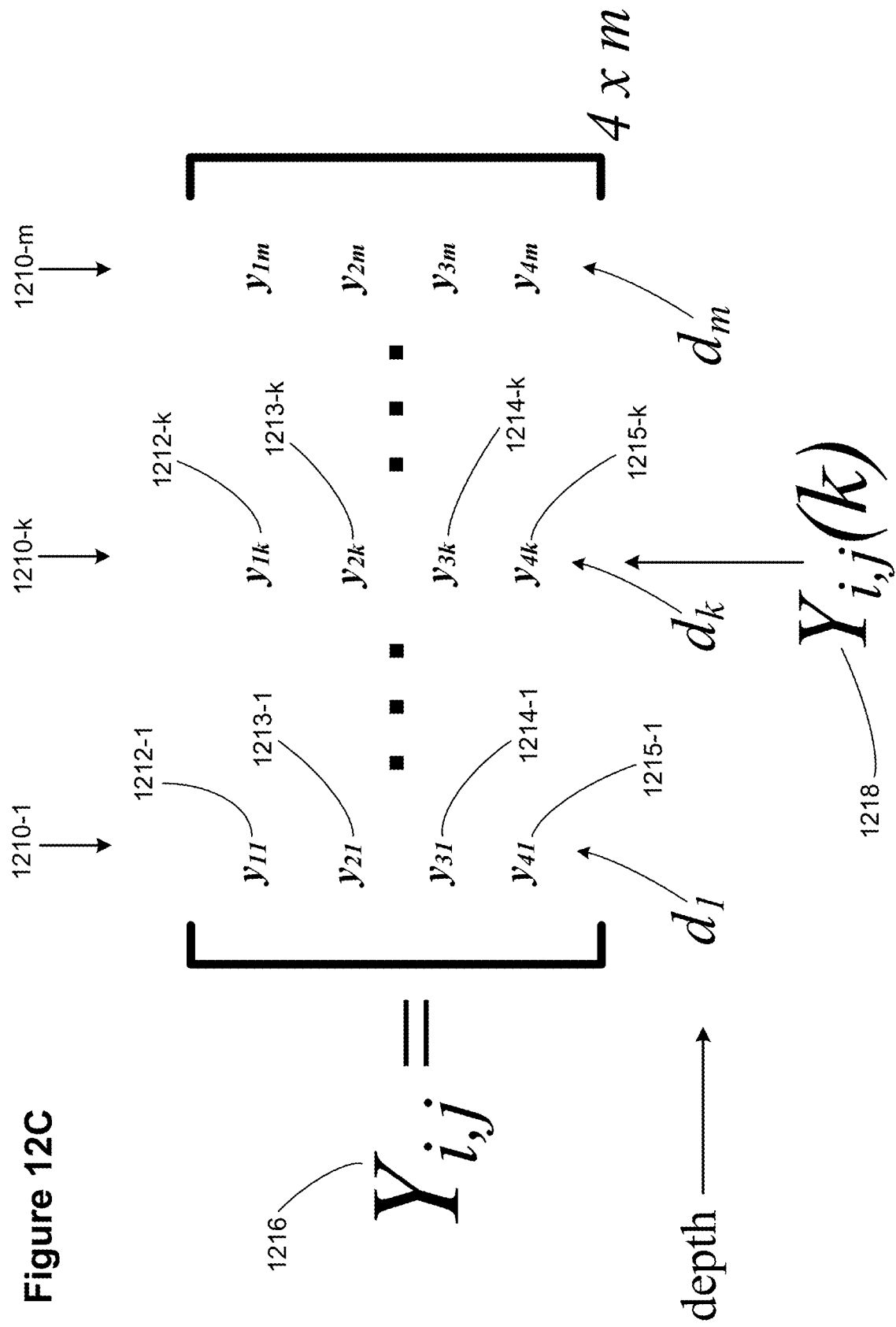

FIGS. 12A-12C illustrate a process of building a lookup table for depth estimation in accordance with some implementations. In some implementations, a lookup table is constructed for each pixel in the sensor array based on simulating a surface and computing an expected intensity of reflected light based on the simulated surface and a preselected illumination pattern. In some implementations, the physical sensors of the sensor array 655 are grouped together to simulate an array with a smaller number of pixels. For example, some implementations downsample a 1 megapixel array to about 10,000 pixels by grouping each 10×10 subarray of sensors into a single downsampled pixel. In this example, 100 physical sensors of the array are treated as a single pixel for purposes of building the lookup table and subsequently using the lookup table. In the following description, the term "pixel" will be used to describe the basic unit for a table lookup (each pixel corresponds to a lookup table) regardless of whether the pixel corresponds to a single physical sensor in the sensor array or multiple physical sensors in the sensor array.

To generate a lookup table for a pixel, the lookup table generation module determines an expected reflected light intensity at the pixel based on the simulated surfaces 1203 being at various fixed distances 1201 from the pixel. This is illustrated in FIG. 12A, with fixed distances $d_1$ 1201-1, $d_2$ 1201-2, $d_3$ 1201-3, . . . , $d_m$ 1201-$m$, and surfaces 1203-1, 1203-2, 1203-3, . . . , 1203-$m$. The number of distinct simulated distances 1203 affects the accuracy of the subsequently estimated depths. In this example, all of the surfaces 1203 are planar. In other implementations, the surfaces are spherical, parabolic, cubic, or other appropriate shape. Typically, however, all of the surfaces are of the same type (e.g., there would generally not be a mixture of planar and spherical surfaces). In the simulation, each virtual surface has a constant surface reflectivity.

For each depth 1201, the illuminators 656 of the camera 118 are simulated to activate in accordance with a predefined illumination pattern. An illumination pattern specifies the grouping of illuminators 656 (if any), specifies the order the groups of illuminators are activated, and may specify other parameters related to the operation of the illuminators. FIG. 12B provides an example in which the illuminators 656 are grouped into consecutive pairs in a clockwise orientation and activated in that order. At a first time 1202-1, the top illumination group 1204-1 is activated, at a second time 1202-2 a second illumination group 1204-2 is activated, at a third time 1202-3 a third illumination group 1204-3 is activated, and at a fourth time 1202-4 a fourth illumination group 1204-4 is activated. In the example illustrated in FIG. 12B, there are four illumination groups 1204 in the illumination pattern, so there are four distinct estimated light intensity values.

In some implementations, the estimated light intensity values are placed into an intensity matrix $Y_{i,j}$ 1216, as illustrated in FIG. 12C. In this matrix, each column corresponds to one depth, and each row corresponds to an illumination group from the illumination pattern. For example, the first column 1210-1 corresponds to a first distance $d_1$. The first light intensity estimate 1212-1 corresponds to the first illumination group 1204-1, the second light intensity estimate 1213-1 corresponds to the second illumination group 1204-2, the third light intensity estimate 1214-1 corresponds to the third illumination group 1204-3, and the fourth light intensity estimate 1215-1 corresponds to the fourth illumination group 1204-4.

The kth column 1210-$k$ in the intensity matrix $Y_{i,j}$ 1216 has four light intensity estimates 1212-$k$, 1213-$k$, 1214-$k$, and 1215-$k$, corresponding to the same four illumination groups in the illumination pattern. Finally, the mth column 1210-$m$ has four list intensity estimates corresponding to the same four illumination groups in the illumination pattern. Note that the matrix $Y_{i,j}$ 1216 is for a single pixel i,j (e.g., as downsampled from the sensor array 655).

As currently computed, the entries in the intensity matrix $Y_{i,j}$ 1216 depend on the reflectivity ρ of the simulated surface. Because different actual surfaces have varying reflectivities, it would be useful to "normalize" the matrix in a way that eliminates the reflectivity constant ρ. In some implementations, the columns of the intensity matrix $Y_{i,j}$ 1216 are normalized by dividing the elements of each column by the length (e.g., $L_2$ norm) of the column. The normalized column $\tilde{Y}_{i,j}(k)$ is computed from the column $Y_{i,j}(k)$ 1218 by dividing each component by the length $\|Y_{i,j}(k)\|_2 = \sqrt{y_{1k}^2 + y_{2k}^2 + y_{3k}^2 + y_{4k}^2}$. Performing the same normalization process for each column in the intensity matrix $Y_{i,j}$ 1216 creates a normalized lookup table $\tilde{Y}_{i,j}$.

Note that after normalization, each column of the lookup table $\tilde{Y}_{i,j}$ has the same normalized length, even though each column corresponds to a different distance from the sensor array. However, the distribution of values across the elements (corresponding to the illumination groups) are different for different depths (e.g., the normalized first column is different from the normalized kth column). Some implementations take advantage of symmetry to reduce the number of lookup tables. For example, using the illumination pattern illustrated in FIG. 12B, some implementations reduce the number of lookup tables by a factor of four (e.g., using rotational symmetry), or reduce the number of lookup tables by a factor of eight (e.g., using rotational symmetry and reflection symmetry).

FIGS. 13A-13D illustrate a process of creating a depth map using a sequence of captured IR images in accordance with some implementations. The depth map estimates the depth of objects in a scene. The scene is typically all or part of the field of vision of a camera 118. The depth map is created for a 2-dimensional array of pixels. In some implementations, the pixels correspond to the individual image sensors in the image sensor array 655. In some implementations, each pixel corresponds to plurality of individual image sensors from the array 655. For example, in some implementations, each pixel corresponds to a 10×10 square subarray of image sensors.

In each of FIGS. 13A-13D, the scene is illuminated by a different group of illuminators 656 of the camera 118 in accordance with an illumination pattern. Typically, the illumination pattern used for generating the lookup tables is used again for creating a depth map of a scene. That is, the illuminators are grouped into the same illumination groups, are activated in the same order, and use the same parameters (e.g., power and length of activation). As shown in FIGS. 13A-13D, each illumination group focuses light on a different portion of the scene. For example, the illumination group 1302-1 in FIG. 13A creates a brighter portion 1304-1 at the top of the scene, and the illumination group 1302-3 in FIG. 13C creates a brighter portion 1304-3 at the bottom of the scene. Similarly, the illumination group 1302-2 in FIG. 13B creates a brighter portion 1304-2 on the right side of the scene and the illumination group 1302-4 in FIG. 16D creates a brighter portion 1304-4 on the left side of the scene. In the example of FIGS. 13A-13D, there are four captured images 1306-1, 1306-2, 1306-3, and 1306-4 based on the four illumination groups 1302. In addition, in some implementations, a fifth image is captured when none of the illuminators are activated.

A vector $\vec{b}_{i,j}$ is constructed for each pixel i,j. The four components of the vector correspond to the four distinct illumination groups 1302-1, 1302-2, 1302-3, and 1302-4. The first component $b_1 - b_0$ is the light intensity $b_1$ at the pixel when the first illumination group 1302-1 is active minus the light intensity $b_0$ at the pixel from the baseline image. Similarly, the second component $b_2 - b_0$ is the light intensity $b_2$ at the pixel when the second illumination group 1302-2 is active minus the light intensity $b_0$ at the pixel from the baseline image.

For each individual pixel there is a separate lookup table, which is generated as described above by simulating virtual surfaces at different depths. The actual depth in the scene at the pixel is determined by finding the closest matching record in the lookup table for the pixel. In this example, the vector $\vec{b}_{i,j}$ and the records in the lookup table are four dimensional vectors. In some implementations, the closest match is computed by finding the lookup table record whose "direction" in $R^4$ most closely aligns with the sample vector $\vec{b}_{i,j}$. The lookup table index $\hat{k}$ is estimated by computing the dot product of the normalized lookup table records $\tilde{Y}_{i,j}(k)$ with the sample vector $\vec{b}_{i,j}$, and selecting the index for which the dot product is maximal. The estimated depth corresponds to the index $\hat{k}$.

In the example illustrated in FIGS. 13A-13D, the eight illuminators are grouped into four illumination groups. However, many other illumination patterns are possible with the same set of eight illuminators. For example, in some implementations, the eight illuminators are activated individually, creating lookup tables with eight rows and vectors with eight components. Some implementations use other illumination patterns as well. For example, some implementations use two illuminators at a time, but use each illuminator in two groups (e.g., a first group consisting of illuminators 1 and 2, a second group consisting of illuminators 2 and 3, a third group consisting of illuminators 3 and 4, etc.).

Figure 14A:
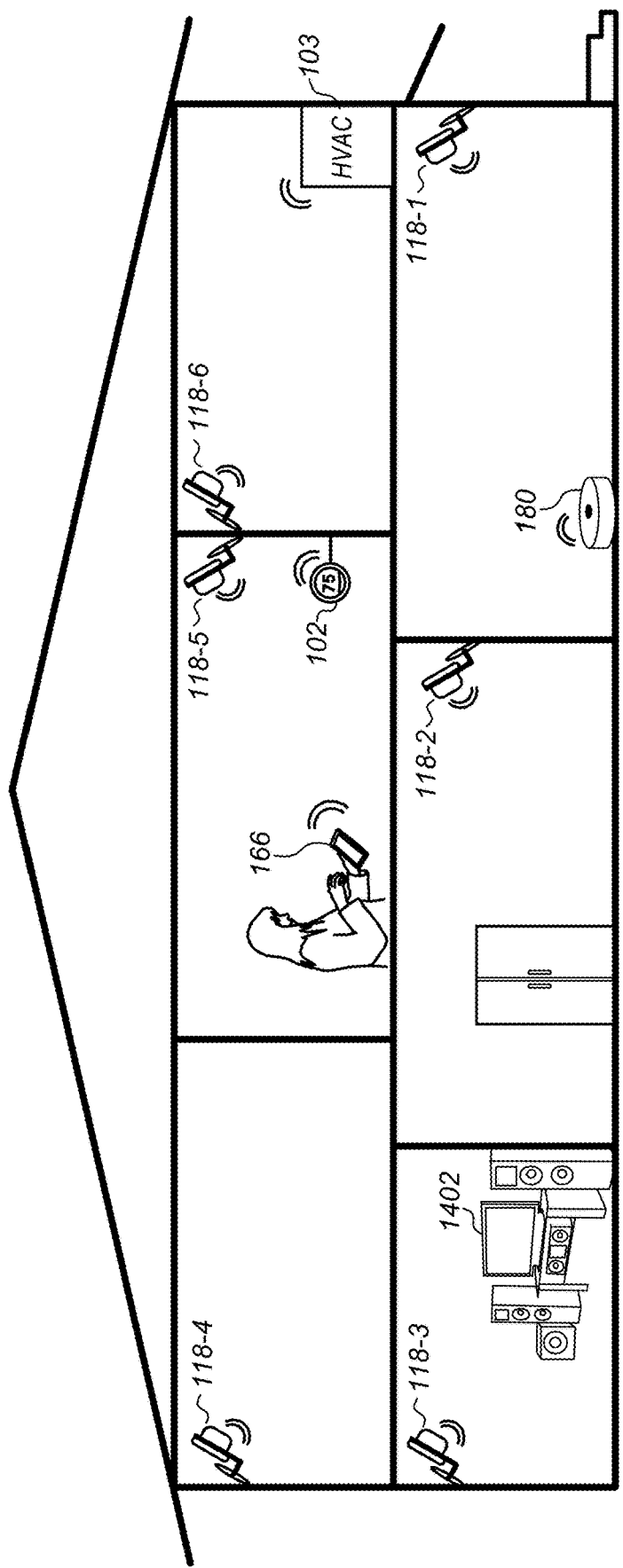

FIGS. 14A-14B illustrate environments and systems for relaying IR commands via one or more camera devices, in accordance with some implementations. FIG. 14A illustrates a smart home environment that includes a plurality of cameras 118 (e.g., camera 118-1 through 118-6), a portable electronic device 166, a hub device 180, an HVAC system 103, a smart thermostat 102, and an entertainment system 1402. In the environment illustrated by FIG. 14A a user can operate one or more electronic devices with IR receivers (such as smart thermostat 102, HVAC system 103, and/or entertainment system 1402) via the portable electronic device 166. A user request generated at portable electronic device 166 is received by the smart home system and relayed to the appropriate smart device. Next an IR signal is generated based on the request and is transmitted to the target device.

For example, a user of the portable electronic device 166 sends a request to operate the entertainment system 1402. In some implementations, the request is sent via wireless communication using any of a variety of custom or standard wireless protocols, including those utilizing RF and/or IR bands. The request is received by a smart device (e.g., a smart device 204, FIG. 2) such as a camera 118 (e.g., via sensor array 655) and/or the hub device 180 (e.g., via radios 740). In some implementations, the request is received by a camera 118 and is send to the hub device 180 for routing/ processing. In some implementations, the request is received by a smart device and is sent to the server system 508 for routing/processing. In this example, the request is then relayed to camera 118-3. The camera 118-3 generates an IR signal based on the request (e.g., using IR module 688 and IR data 684). The camera 118-3 then transmits the IR signal to the entertainment system 1402, which receives the signal via an IR receiver. In some implementations, the camera 118-3 transmits the IR signal via one or more of the illuminators 656 (FIG. 11A).

In some implementations, the camera determines where to relay the request. In some implementations, the hub device determines where to relay the request based on a location mapping (e.g., location maps 7243, FIG. 7). In some implementations, a server system (e.g., server system 508, FIG. 8) determines where to relay the request based on location mapping data (e.g., location mapping data 856).

In some implementations, the smart device (e.g., the camera or hub device) broadcasts the request to all nearby devices. In some implementations, the smart device broadcasts the request along with information identifying the intended target/destination. For example, the smart device determines a target device based on a location map and includes an identifier for the target device in the broadcasted request. In some implementations, a device receiving the broadcasted request determines whether or not to process/relay the request. In some implementations, a device receiving the broadcasted request determines, based on location mapping data, whether to relay the request. For example, the device receiving the broadcasted request determines, based on a location map, whether it is capable of communicating via IR with the entertainment system 1402.

In the environment shown in FIG. 14A, the cameras 118 (or components thereof) are optionally used to capture still images of the corresponding scene for use in creating depth maps as described above with respect to FIGS. 12A-12C; and/or capture a video stream for processing as described above with respect to FIG. 10. For example, camera 118-3 operates in three modes. In the first mode, the camera 118-3 captures a video stream of a scene that includes the entertainment system 1402. In this mode, the camera 118-3 uses one or more of the illuminators 656 to illuminate the scene. In the second mode, the camera 118-3 generates and transmits an IR signal to communicate with the entertainment system 1402 (e.g., to adjust the volume of the entertainment system). In this mode, the camera 118-3 uses one or more of the illuminators 656 to transmit the IR signal. In the third mode, the camera 118-3 captures still images of the scene for using in generating depth maps. In this mode, the camera 118-3 uses one or more of the illuminators 656 to create illumination patterns in the still images.

Although FIG. 14A shows the user request generated at a portable electronic device, in accordance with some implementations, the user request is generated at a stationary electronic device such as a desktop computer. In some implementations, the user request is generated at a smart device, such as a smart thermostat. For example, a user adjusts a desired temperature at the smart thermostat 102. The smart thermostat 102 then generates a user request based on the user adjustments and transmits a signal to relay the request to HVAC system 103. The signal is: (1) received by camera 118-5, (2) relayed to camera 118-6, and (3) transmitted to HVAC system 103.

In addition, although FIG. 14A shows wireless communication between devices, in some implementations, one or more of the electronic devices communicate via one or more wired connections. For example, portable electronic device 166 communicates with hub device 180 via an Ethernet connection. As another example, hub device 180 communicates with one or more of cameras 118 (e.g., camera 118-3) via a wired connection.

Also, although FIG. 14A shows the user within the smart home, in some implementations, the user is remote from the smart home and communicates with the smart home via one or more network(s) (e.g., network(s) 162, FIG. 1). In some implementations, the user request is received via an internet access point, such as a router. For example, the user is remote from the smart home and wishes to adjust the temperature within the smart home. The user sends a request via an external network, such as the Internet. The request is received by a smart device, such as smart thermostat 102 (e.g., acting as a border router). The request is then relayed from the smart thermostat 102 to HVAC system 103 via one or more smart devices, such as camera 118-6.

FIG. 14B illustrates a smart home environment that includes portable electronic device 1404, camera 118-1, camera 118-2, and entertainment system 1402. In the environment illustrated by FIG. 14B a user operates the entertainment system 1402 via the portable electronic device 1404. A user request generated at the portable electronic device 1404 is transmitted via signal 1406 to camera 118-1. The request is relayed via signal 1408 from camera 118-1 to camera 118-2. An IR signal is generated at camera 118-2 and is transmitted via signal 1410 to the entertainment system 1402.

In some implementations, the portable electronic device 1404 is a remote control (e.g., a remote control configured to communicate with entertainment system 1402). In some implementations, signal 1404 comprises an IR signal, while, in other implementations, signal 1404 comprises an RF signal. In some implementations, the camera 118-1 receives the request in a first protocol and converts the request to a second protocol prior to relaying it to the camera 118-2. In some implementations, signal 1408 is relayed via a wireless connection, while, in other implementations, signal 1408 is relayed via a wired connection.

Although FIG. 14B shows the user request relayed directly from camera 118-1 to camera 118-2, in some implementations, the user request is relayed from camera 118-1 to camera 118-2 via one or more additional devices such as a hub device.

Representative Processes

Figure 15A:
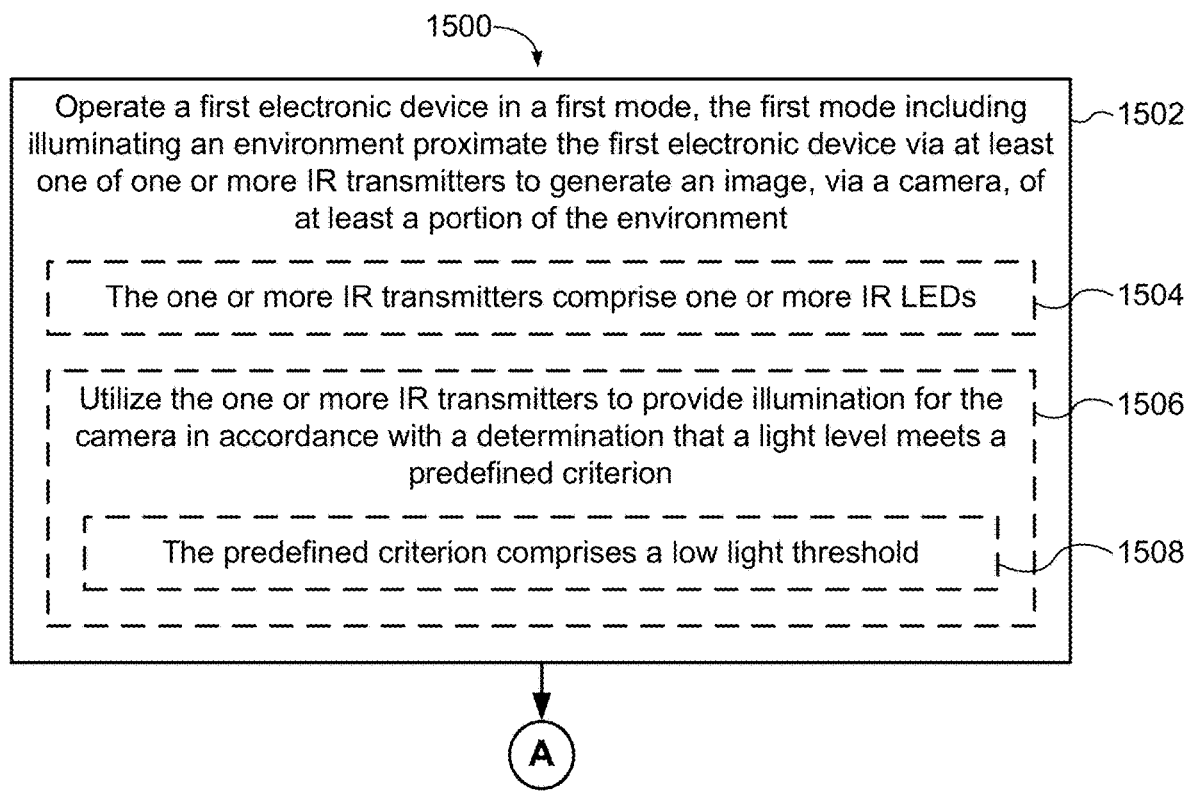
FIGS. 15A-15B illustrate a flowchart representation of a method of operating an electronic device with one or more IR transmitters, in accordance with some implementations.
Figure 15B:
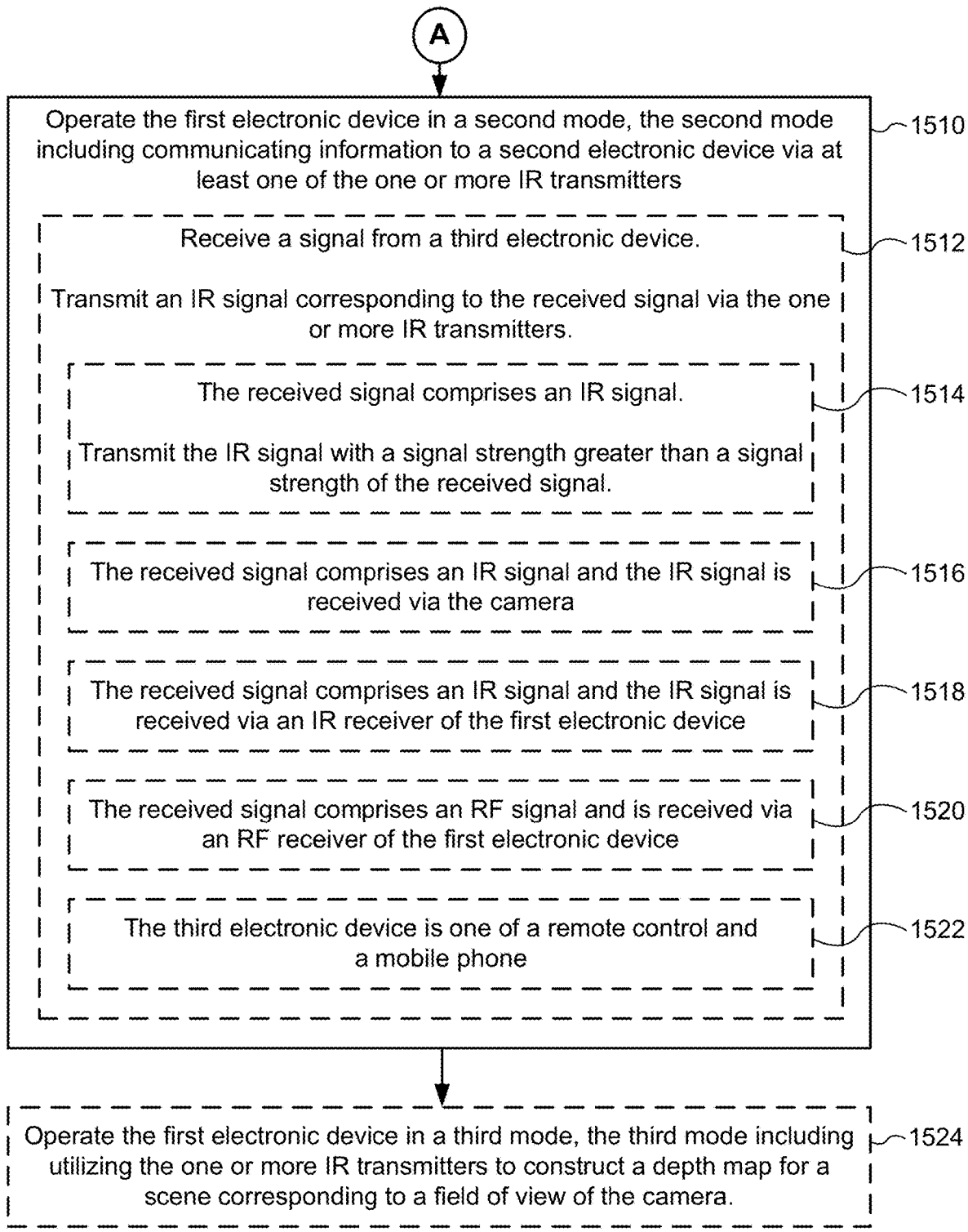
Figure 16:
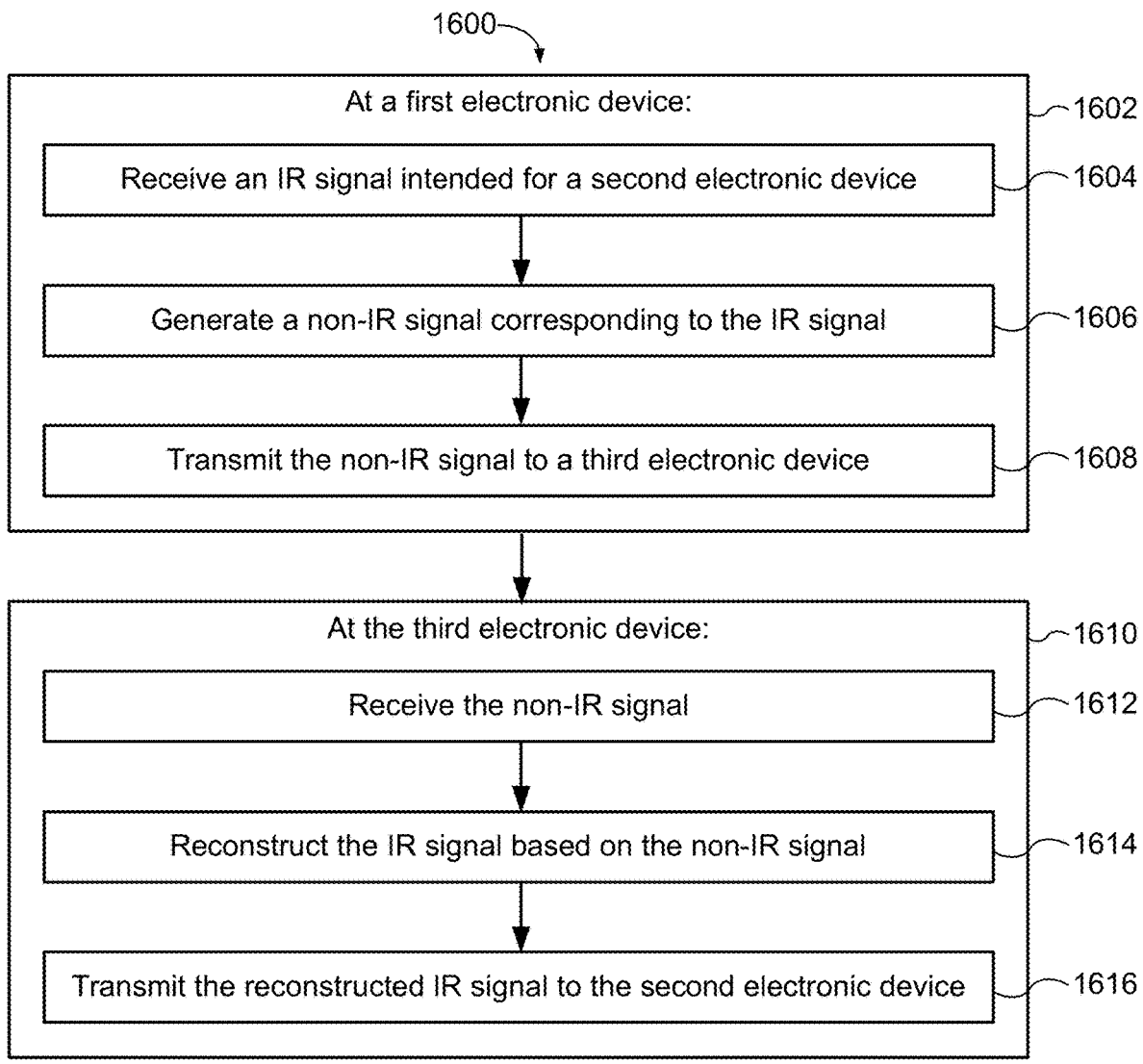
FIG. 16 illustrates a flowchart representation of a method of relaying IR signals, in accordance with some implementations.
Figure 17:
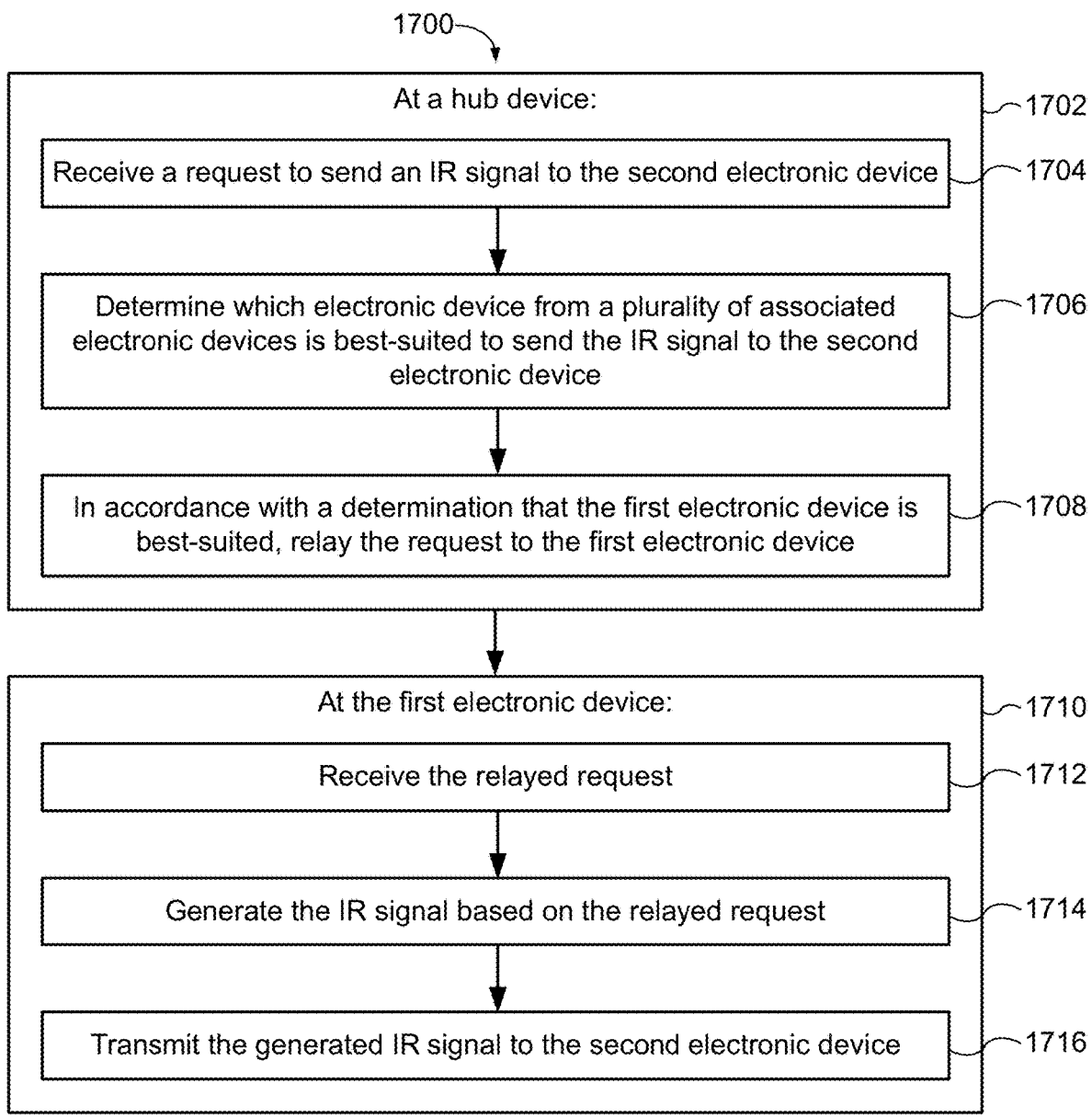
FIG. 17 illustrates a flowchart representation of a method of transmitting IR signals, in accordance with some implementations.

Attention is now directed to the flowchart representations of FIGS. 15A-15B, FIG. 16, and FIG. 17. FIGS. 15A-15B illustrate a flowchart representation of a method 1500 of operating an electronic device with one or more IR transmitters, in accordance with some implementations. FIG. 16 illustrates a flowchart representation of a method 1600 of relaying IR signals, in accordance with some implementations. FIG. 17 illustrates a flowchart representation of a method 1700 of transmitting IR signals, in accordance with some implementations.

In some implementations, the methods 1500, 1600, and 1700 are performed by: (1) one or more electronic devices of one or more systems, such as the devices of a smart home environment 100, FIG. 1; (2) one or more computing systems, such as smart home provider server system 164 of FIG. 1 and/or server system 508 of FIG. 5; or (3) a combination thereof. Thus, in some implementations, the operations of the methods 1500, 1600, and 1700 described herein are entirely interchangeable, and respective operations of the methods 1500, 1600, and 1700 are performed by any of the aforementioned devices, systems, or combination of devices and/or systems. In some embodiments, methods 1500, 1600, and 1700 are governed by instructions that are stored in a non-transitory computer readable storage medium and that are executed by one or more processors of a device/computing system, such as the one or more CPU(s) 640 of a camera 118 and/or the one or more CPU(s) 512 of server system 508.

Referring now to FIGS. 15A-15B. A first electronic device operates (1502) in a first mode, the first mode including illuminating an environment proximate the first electronic device via at least one of one or more IR transmitters to generate an image, via a camera, of at least a portion of the environment. For example, the camera 118 in FIG. 11A illuminates the environment via illuminators 656 and generates an image via sensor array 655. In some implementations, the first electronic device illuminates the environment using an illumination module 674, illuminator settings 673, and one or more of illuminators 656, as shown in FIG. 6B. In some implementations, the first electronic device illuminates at least a portion of a scene captured by the camera. In some implementations, the first electronic device is an electronic device within a smart home environment, such as a camera 118 (FIG. 1).

In some implementations, the one or more IR transmitters comprise (1504) one or more IR LEDs. In some implementations, the transmitters comprise semiconductor lasers or other semiconductor light sources. In some implementations, the one or more IR transmitters are configured to transmit light in one or more additional spectrums such as RGB light.

In some implementations, the first electronic device utilizes (1506) the one or more IR transmitters to provide illumination for the camera in accordance with a determination that a light level meets a predefined criterion. For example, the first electronic device determines that the light level meets the predefined criterion using one or more of illumination module 674, image capture module 674, and video processing module 688. In some implementations, a server system (e.g., server system 508, FIG. 8) determines whether the light level meets the predefined criterion. In some implementations, a hub device (e.g., hub device 180, FIG. 7) determines whether the light level meets the predefined criterion. In some implementations, the first electronic device utilizes the one or more IR transmitters to provide targeted illumination for the camera. For example, FIG. 13A shows targeted illumination in portion 1304-1 corresponding to illumination group 1302-1. In some implementations, the first electronic device determines where to target the illumination based on one or more environmental features such as relative light levels within the scene, distances within the scene, and points/zones of interest within the scene. In some implementations, another device/system, such as a hub device 180 and/or a server system 508, determines where to target the illumination. In some implementations, the targeted illumination is set so as to optimize the quality of the video stream and/or still images generated by the camera. In some implementations, a user identifies where to target the illumination (e.g., via a client device 504, FIG. 9).

In some implementations, the predefined criterion comprises (1508) a low light threshold. In some implementations, the first electronic device utilizes the one or more IR transmitters to provide illumination for the camera in accordance with a determination that a light level meets two or more predefined criteria. For example, the predefined criterion (or criteria) is optionally based on one or more of the following: light levels within the scene, distances to objects within the scene, sensor array settings, reflectivity of surfaces within the scene, and the like. In some implementations, the predefined criterion (or criteria) is based on the capabilities of the camera and is set so as to optimize the quality of the video stream and/or still images generated by the camera. In some implementations, the light levels within the scene are determined by the camera (e.g., by processing captured images of the scene). In some implementations, the light levels are determined by a server system. In some implementations, the low light threshold is set by the camera (e.g., camera 118). In some implementations, the low light threshold is set by a server system (e.g., server system 508). In some implementations, the low light threshold is based on user input (e.g., received via client device 504, FIG. 9).

The first electronic device operates (1510) in a second mode, the second mode including communicating information to a second electronic device via at least one of the one or more IR transmitters. In some implementations, the first electronic device communicates the information to the second electronic device via all of the IR transmitters. In some implementations, the first electronic device determines which IR transmitters are directed toward the second electronic device and communicates with the second electronic device utilizing those IR transmitters. In some implementations, the first electronic device determines which IR transmitters are directed toward the second electronic device based on one or more depth maps (e.g., depth maps 685) and/or one or more location maps. In some implementations, another device/system, such as a hub device or server system, determines which IR transmitters are directed toward the second electronic device and sends that information to the first electronic device.

In some implementations, the location map(s) are constructed using location information of the first electronic device (e.g., via location detection device 657), positioning information of the first electronic device (e.g., field of view information), and the like. In some implementations, the location maps are based in part on information input by a user (e.g., via a client device 504). In some implementations, the location maps comprise information, such as one or more tables, indicating which devices are capable of communicating with which other devices using particular forms of communication, such as IR signals.

In some implementations, the second electronic device is a smart device 204 (FIG. 2). In some implementations, the second electronic device is an electronic device with an IR receiver such as an entertainment system, HVAC system, smart thermostat, and the like. For example, FIG. 14B shows camera 118-2 communicating with entertainment system 1402. In some implementations, the second electronic device is an electronic device within a smart home environment, such as HVAC 103 (FIG. 1). In some implementations, the second electronic device is within the same smart home environment as the first electronic device.

In some implementations, the first electronic device receives (1512) a signal from a third electronic device and transmits an IR signal corresponding to the received signal via the one or more IR transmitters. In some implementations, the second mode further includes receiving and processing IR signals. In some implementations, the first mode further includes receiving IR signals. For example, the first electronic device is operating in the first mode and receives a request (e.g., via an IR signal) to communicate with the second electronic device via the IR transmitters. In response to the request, the first electronic device switches to a second mode and communicates with the second electronic device.

In some implementations, switching to the second mode includes adjusting the operating conditions of the illuminators 656 based on one or more illuminator settings 673. In some implementations, the first electronic device switches back to the first mode automatically after it finishes its communications with the second electronic device. In some implementations, the third electronic device is another smart device (such as another camera 118). In some implementations, the third electronic device is a hub device. In some implementations, the third electronic device is a client device.

In some implementations, the received signal comprises an IR signal and the first electronic device transmits (1514) the IR signal with a signal strength greater than a signal strength of the received signal. In some implementations, the third electronic device includes only one IR transmitter and/or operates its IR transmitter(s) with less power/intensity than the first electronic device. For example, the third electronic device is a low power IR remote that operates on several milliwatts of power whereas the first electronic device operates on one or more watts of power. In some implementations, the first electronic device acts as a power amplifier to amplify the signal from the third electronic device. In some implementations, the first electronic device is capable of directing communicates over a wider area than the third electronic device. For example, the first electronic device comprises a camera 118 as shown in FIG. 11C with multiple illuminators angled so as to increase coverage whereas the third electronic device comprises an IR remote or the like with less illuminators than the camera 118 (e.g., with only 1-2 illuminators).

In some implementations, the received signal comprises an IR signal and the IR signal is received (1516) via the camera. For example, the IR signal is received via the sensor array 655 (FIG. 11A). In some implementations, after (or as) the signal is received via the camera, the first electronic device extracts the signal from the video stream using IR module 688 and/or IR receiving sub-module 6881.

In some implementations, the received signal comprises an IR signal and the IR signal is received (1518) via an IR receiver of the first electronic device. For example, the IR signal is received via sensors 654 and/or communication interface 642 (FIG. 6B). In some implementations, after (or as) the signal is received via the IR receiver, the first electronic device processes the signal using IR module 688 and/or IR receiving sub-module 6881.

In some implementations, the received signal comprises an RF signal and is received (1520) via an RF receiver of the first electronic device. For example, the IR signal is received via sensors 654 and/or communication interface 642 (FIG. 6B). In some implementations, after (or as) the signal is received via the RF receiver, the first electronic device generates an IR signal based on the RF signal using IR module 688 and IR data 684. In some implementations, generating the IR signal includes determining the correct IR command sequence for communicating with the second electronic device and generating the IR signal based on that determination. In some implementations, determining the correct IR command sequence includes looking up the correct command sequence in a database (e.g., database 682). In some implementations, the correct IR command sequence is determined based on the make/model of the second electronic device. In some implementations, the correct IR command sequence is determined based one or more received IR command sequences associated with the second electronic device. In some implementations, the correct IR command sequence is determined based on a process of trial and error using a database of known command sequences.

In some implementations, the third electronic device is (1522) one of (1) a remote control and (2) a mobile phone. In some implementations, the third electronic device is a remote control that generates IR signals. In some implementations, the third electronic device is a remote control that generates RF signals. In some implementations, the third electronic device is a remote control configured to communicate with the second electronic device. In some implementations, the remote control is a universal remote. In some implementations, the third electronic device is a mobile phone and the received signal is sent via Wi-Fi or Bluetooth protocols. In some implementations, the third electronic device is a mobile phone and the received signal is sent via an IR transmitter on the mobile phone. In some implementations, the third electronic device is a mobile phone and the received signal is generated at the mobile phone based on one or more user inputs (e.g., received via a user interface).

In some implementations, the third electronic device is a client device 504 as shown in FIG. 9. For example, the client device 504 receives one or more user inputs via user interface 910 and generates the received signal based on the user inputs (e.g., using IR communications module 938 and/or network communications module 920). In this example, the client device 504 transmits the received signal via network interface(s) 904. In some implementations, the client device 504 receives one or more user inputs via a graphical user interface (GUI) on a display of the client device. In some implementations, the application(s) 924 include an application for communicating with electronic devices, such as the second electronic device, via a smart home environment.

In some implementations, the first electronic device operates (1524) in a third mode, the third mode including utilizing the one or more IR transmitters to construct a depth map for a scene corresponding to a field of view of the camera. For example, the first electronic device includes a camera 118 as shown in FIG. 6B and the first electronic device constructs a depth map (as described above with respect to FIGS. 12A-12C) via depth mapping module 686.

It should be understood that the particular order in which the operations in FIGS. 15A-15B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the method 1500 described above with respect to FIGS. 15A-15B.

Referring now to FIG. 16. At a first electronic device (1602), a system receives (1604) an IR signal intended for a second electronic device. For example, the first electronic device is a camera 118 and the IR signal is received via sensor array 655, communication interface(s) 642, and/or sensors 655 (FIG. 6B). In some implementations, the first electronic device operates as discussed above with respect to FIGS. 15A-15B. In accordance with some implementations, camera 118-1 in FIG. 14B receives an IR signal 1406. In some implementations, the first electronic device is a hub device and the IR signal is received via communication interface(s) 704 (FIG. 7).

At the first electronic device (1602), the system generates (1606) a non-IR signal corresponding to the IR signal. For example, the first electronic device is a camera 118 and the non-IR signal is generated via communication module 660 and/or IR module 688 (FIG. 6B).

At the first electronic device (1602), the system transmits (1608) the non-IR signal to a third electronic device. For example, the third electronic device is a camera 118 and the non-IR signal is received via communication interface(s) 642 and/or sensors 655. In some implementations, the non-IR signal is transmitted via a wired connection. In some implementations, the non-IR signal is transmitted via a wireless connection. In accordance with some implementations, camera 118-1 in FIG. 14B transmits the non-IR signal 1408 to camera 118-2. In some implementations, transmitting the non-IR signal to the third electronic device includes transmitting the non-IR signal via one or more additional electronic devices, such as a hub device.

At the third electronic device (1610), the system receives (1612) the non-IR signal. For example, the third electronic device is a camera 118 and the non-IR signal is received via communication interface(s) 642 and/or sensors 655 (FIG. 6B). In some implementations, the third electronic device operates as discussed above with respect to FIGS. 15A-15B. In accordance with some implementations, camera 118-2 in FIG. 14B receives a non-IR signal 1408 from camera 118-1.

At the third electronic device (1610), the system reconstructs (1614) the IR signal based on the non-IR signal. For example, the third electronic device is a camera 118 and the IR signal is reconstructed utilizing IR module 688 and/or IR data 684 (FIG. 6B).

At the third electronic device (1610), the system transmits (1616) the reconstructed IR signal to the second electronic device. For example, the third electronic device is a camera 118 and the reconstructed IR signal is transmitted utilizing illuminators 656 in conjunction with IR module 688. In some implementations, transmitting the reconstructed IR signal includes operating the illuminators 656 in accordance with one or more predefined illuminator settings 673. In accordance with some implementations, camera 118-2 in FIG. 14B transmits the reconstructed IR signal 1410 to entertainment system 1402. In some implementations, the reconstructed IR signal is transmitted to a smart device 204.

It should be understood that the particular order in which the operations in FIG. 16 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the method 1600 described above with respect to FIG. 16.

Referring now to FIG. 17. At a hub device (1702), a system receives (1704) a request to send an IR signal to a second electronic device. For example, the hub device is a hub device 180 (FIG. 7) and the request is received communication interface(s) 704, and/or radios 740. In some implementations, the request was generated based on one or more user inputs (e.g., at a client device 504). In accordance with some implementations, hub device 180 in FIG. 14A receives a request from portable device 166 to send an IR signal to HVAC system 103.

At the hub device (1702), the system determines (1706) which electronic device from a plurality of associated electronic devices is best-suited to send the IR signal to the second electronic device. In some implementations, the determination is based on location and positioning information for the plurality of associated electronic devices. In some implementations, the determination is based on one or more location maps (e.g., location maps 7243, FIG. 7). In some implementations, the plurality of associated electronic devices includes smart devices within the same smart home environment as the hub device. In accordance with some implementations, hub device 180 in FIG. 14A determines that camera 118-6 is best-suited to send the IR signal to HVAC system 103. For example, hub device 180 determines that camera 118-6 is best-suited because it is in the same room as the HVAC system 103 and/or because it is facing the HVAC system 103.

At the hub device (1702), the system relays (1708) the request to a first electronic device in accordance with a determination that the first electronic device is best-suited. In some implementations, the hub device transmits the request to the first electronic device using radios 740 and/or communication interface(s) 704. In some implementations, the request is transmitted via a wired connection. In some implementations, the request is transmitted via a wireless connection. In some implementations, the first electronic device operates as discussed above with respect to FIGS. 15A-15B. In some implementations, relaying the request includes translating the request from a first protocol (such as Bluetooth) to a second protocol (such as Wi-Fi). In some implementations, relaying the request includes relaying the request through one or more additional electronic devices and/or systems. In accordance with some implementations, hub device 180 in FIG. 14A relays the request to camera 118-6.

At the first electronic device (1710), the system receives (1712) the relayed request. For example, the first electronic device is a camera 118 and the request is received via communication interface(s) 642 and/or sensors 655 (FIG. 6B). In accordance with some implementations, camera 118-6 in FIG. 14A receives the relayed request from hub device 180.

At the first electronic device (1710), the system generates (1714) the IR signal based on the relayed request. For example, the first electronic device is a camera 118 and the IR signal is generated utilizing IR module 688 and/or IR data 684 (FIG. 6B). In some implementations, the IR signal includes an IR command sequence and generating the IR signal includes utilizing IR data in a database (e.g., IR data 684) to determine the correct IR command sequence to generate. In some implementations, generating the IR signal includes obtaining one or more illuminator settings 673 for operating the illuminators 656 so as to transmit the IR signal. In accordance with some implementations, camera 118-6 in FIG. 14C generates the IR signal.

At the first electronic device (1710), the system transmits (1716) the generated IR signal to the second electronic device. For example, the first electronic device is a camera 118 and the generated IR signal is transmitted utilizing illuminators 656 in conjunction with illuminator settings 673 and/or IR module 688 (FIG. 6B). In some implementations, transmitting the generated IR signal includes operating the illuminators 656 in accordance with one or more predefined illuminator settings 673. In accordance with some implementations, camera 118-2 in FIG. 14B transmits the reconstructed IR signal 1410 to entertainment system 1402. In some implementations, the reconstructed IR signal is transmitted to a smart device 204. In accordance with some implementations, camera 118-6 in FIG. 14C transmits and/or communicates the generated IR signal to the HVAC system 103.

In some implementations, the first electronic device receives confirmation that the generated IR signal was received at the second electronic device. In some implementations, the confirmation is generated by the second electronic device. In some implementations, the confirmation is sent via one or more IR signals from the entertainment system 1402 to the camera 118-3. In some implementations, the confirmation is received by a plurality of devices and communicated to the hub device 180. In some implementations, the confirmation is used to update location/positioning information, such as location maps 7243. In some implementations, not receiving a confirmation in response to a transmitted IR signal is used to update location/positioning information, such as location maps 7243. In some implementations, information regarding which devices received the confirmation is used to update location/positioning information, such as location maps 7243.

As an example, a request is generated at the portable electronic device 166 in FIG. 14A. In this example, the request is communicated to camera 118-5 (e.g., via Bluetooth) and then relayed from the camera 118-5 to the hub device 180 (e.g., via Ethernet). The hub device 180 determines that the request is a request to change the channel on the entertainment system 1402 and determines that the camera 118-3 is best-suited to send the IR signal because the camera 118-3 is located in the same room as entertainment system 1402. The hub device relays the request to the camera 118-3 (e.g., via Wi-Fi). The camera 118-3 receives the request, generates an IR signal based on the request, and transmits the IR signal to the entertainment system 1402.

In some implementations, the request generated at the portable electronic device 166 is received by a plurality of electronic devices, such as camera 118-5 and camera 118-6. In some implementations, the request is relayed by each device to the hub device 180. In some implementations, the hub device 180 filters out duplicate requests. For example, the hub device 180 forgoes determining the best-suited device and/or forgoes relaying the request to the best-suited device.

It should be understood that the particular order in which the operations in FIG. 17 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the method 1700 described above with respect to FIG. 17.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method comprising:
at a first electronic device having a camera, one or more infrared (IR) transmitters, one or more processors, and memory coupled to the one or more processors:
operating the first electronic device in a first mode, the first mode including illuminating an environment proximate the first electronic device via at least one of the one or more IR transmitters to generate an image, via the camera, of at least a portion of the environment;
receiving a command to be relayed to a second electronic device;
in response to receiving the command to be relayed, switching operation of the first electronic device to operating in a second mode, the second mode including communicating the command to be relayed to the second electronic device via at least one of the one or more IR transmitters.

2. The method of claim 1, wherein the one or more IR transmitters comprise one or more IR light-emitting diodes (LEDs).

3. The method of claim 1, wherein the command to be relayed is received from a third electronic device.

4. The method of claim 3, wherein the command to be relayed is received via an IR signal; and
wherein transmitting the command to be relayed via the one or more IR transmitters comprises transmitting an IR signal with a signal strength greater than a signal strength of the received signal.

5. The method of claim 3, wherein the command to be relayed is received via an IR signal and the IR signal is received via an image sensor of the camera.

6. The method of claim 3, wherein the command to be relayed is received via an IR signal and the IR signal is received via an IR receiver of the first electronic device.

7. The method of claim 3, wherein the command to be relayed is received via a radio-frequency (RF) signal and the RF signal is received via an RF receiver of the first electronic device.

8. The method of claim 3, wherein the third electronic device is one of:
a remote control; and
a mobile phone.

9. The method of claim 1, wherein illuminating the environment proximate the first electronic device via the at least one of the one or more IR transmitters comprises utilizing the one or more IR transmitters to provide illumination for the camera in accordance with a determination that a light level meets a predefined criterion.

10. The method of claim 9, wherein the predefined criterion comprises a low light threshold.

11. The method of claim 1, further comprising operating the first electronic device in a third mode, the third mode including utilizing the one or more IR transmitters to construct a depth map for a scene corresponding to a field of view of the camera.

12. The method of claim 1, further comprising:
at the first electronic device:
receiving the command to be relayed via an IR signal;
generating a non-IR signal corresponding to the IR signal; and
transmitting the non-IR signal to a third electronic device;
at the third electronic device:
receiving the non-IR signal;
reconstructing the IR signal based on the non-IR signal; and
transmitting the reconstructed IR signal to the second electronic device.

13. The method of claim 1, further comprising:
at a hub device:
receiving a request to send an IR command to the second electronic device;
determining which electronic device from a plurality of associated electronic devices is best-suited to send the IR command to the second electronic device, including determining which electronic devices from the plurality of associated electronic devices have line of sight to the second electronic device; and
in accordance with a determination that the first electronic device is best-suited, relaying the request to the first electronic device;
at the first electronic device:
receiving the relayed request;
generating the IR signal based on the relayed request; and
transmitting the generated IR signal to the second electronic device.

14. An electronic device, comprising:
a camera;
one or more infrared (IR) transmitters;
one or more processors; and
memory storing one or more programs to be executed by the one or more processors, the one or more programs comprising instructions for:
operating the first electronic device in a first mode, the first mode including illuminating an environment proximate the first electronic device via at least one of the one or more IR transmitters to generate an image, via the camera, of at least a portion of the environment;
receiving a command to be relayed to a second electronic device;
in response to receiving the command to be relayed, switching operation of the first electronic device to operating in a second mode, the second mode including communicating the command to be relayed to the second electronic device via at least one of the one or more IR transmitters.

15. The device of claim 14, wherein the command to be relayed is received from a third electronic device.

16. The device of claim 14, the one or more programs further comprising instructions for:
receiving the command to be relayed via an IR signal;
generating a non-IR signal corresponding to the received IR signal; and
transmitting the non-IR signal to a third electronic device.

17. The device of claim 14, the one or more programs further comprising instructions for:
receiving a request to send an IR command to the second electronic device;
determining which electronic device from a plurality of associated electronic devices is best-suited to send the IR command to the second electronic device, including determining which electronic devices from the plurality of associated electronic devices have line of sight to the second electronic device; and
in accordance with a determination that a third electronic device is best-suited, relaying the request to the third electronic device.

18. A non-transitory computer-readable storage medium storing one or more programs, the one or more programs comprising instructions, which, when executed by an electronic device having a camera, one or more infrared (IR) transmitters, and one or more processors, cause the device to perform operations comprising:
operating the first electronic device in a first mode, the first mode including illuminating an environment proximate the first electronic device via at least one of the one or more IR transmitters to generate an image, via the camera, of at least a portion of the environment;
receiving a command to be relayed to a second electronic device;
in response to receiving the command to be relayed, switching operation of the first electronic device to operating in a second mode, the second mode including communicating the command to be relayed to the second electronic device via at least one of the one or more IR transmitters.

19. The storage medium of claim 18, wherein the command to be relayed is received from a third electronic device.

20. The storage medium of claim 18, the one or more programs further comprising instructions for:
receiving the command to be relayed via an IR signal;
generating a non-IR signal corresponding to the received IR signal; and
transmitting the non-IR signal to a third electronic device.

* * * * *